United States Patent
Suzuki et al.

[11] Patent Number: 6,018,362
[45] Date of Patent: *Jan. 25, 2000

[54] STILL CAMERA CAPABLE OF EFFICIENTLY SELECTING COMPRESSION RATIO

[75] Inventors: Masahiro Suzuki, Kawasaki; Koichiro Minamino, Machida, both of Japan

[73] Assignee: Nikon Corporation, Toyko, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/784,253

[22] Filed: Jan. 15, 1997

Related U.S. Application Data

[62] Division of application No. 08/360,442, Dec. 21, 1994, Pat. No. 5,619,265.

[30] Foreign Application Priority Data

Dec. 21, 1993 [JP] Japan .................................. 5-322824

[51] Int. Cl.[7] .................................................. H04N 5/225
[52] U.S. Cl. ...................... 348/207; 348/231; 348/390; 348/220; 386/117
[58] Field of Search ...................... 348/207, 220, 348/221, 231, 239, 240, 345, 347, 358, 384, 390; 386/67, 109, 111, 112, 117; 358/906, 909.1

[56] References Cited

U.S. PATENT DOCUMENTS

| | | |
|---|---|---|
| 4,963,985 | 10/1990 | Isoguchi et al. . |
| 5,027,214 | 6/1991 | Fujimori . |
| 5,032,927 | 7/1991 | Watanabe et al. . |
| 5,153,730 | 10/1992 | Takahashi . |
| 5,402,171 | 3/1995 | Tagami et al. .......................... 348/219 |
| 5,467,129 | 11/1995 | Suzuki .................................... 348/231 |
| 5,486,861 | 1/1996 | Miyamoto et al. . |
| 5,502,485 | 3/1996 | Suzuki . |
| 5,576,759 | 11/1996 | Kawamura et al. .................... 348/231 |
| 5,619,265 | 4/1997 | Suzuki et al. .......................... 348/362 |

FOREIGN PATENT DOCUMENTS 3-205963  9/1991  Japan .

*Primary Examiner*—Tuan Ho
*Attorney, Agent, or Firm*—Oliff & Berridge, PLC

[57] ABSTRACT

The still camera includes an imaging section which forms an image of an object to be photographed and outputs analog image data; an A/D conversion section which performs A/D conversion upon this analog image data; an aperture device which controls the amount of light incident upon the imaging device; a compression processing section which compresses the digital image data from the A/D conversion section; a memory card upon which the digital image data thus compressed by the compression processing section is stored; a photometric section which measures the brightness of the object to be photographed; and a compression ratio setting section which derives and controls the compression ratio for the compression processing section, based at least upon the distance to an object to be photographed.

13 Claims, 33 Drawing Sheets

FIG. 5

COMPRESSION RATIO SELECTION (IMAGE QUALITY PRIORITY MODE)

| APERTURE VALUE RANGE | COMPRESSION RATIO SETTING |
|---|---|
| APERTURE VALUE (CONTRACTION SIDE) $\geq K_S$ | LOW COMPRESSION RATIO L |
| $K_L <$ APERTURE VALUE $< K_S$ | MEDIUM COMPRESSION RATIO M |
| APERTURE VALUE (OPENING SIDE) $\leq K_L$ | HIGH COMPRESSION RATIO H |

FIG. 6

COMPRESSION RATIO SELECTION (DATA LENGTH PRIORITY MODE)

| APERTURE VALUE RANGE | COMPRESSION RATIO SETTING |
|---|---|
| APERTURE VALUE (CONTRACTION SIDE) $\geq K_S$ | HIGH COMPRESSION RATIO H |
| $K_L <$ APERTURE VALUE $< K_S$ | MEDIUM COMPRESSION RATIO M |
| APERTURE VALUE (OPENING SIDE) $\leq K_L$ | LOW COMPRESSION RATIO L |

FIG. 24

COMPRESSION RATIO SELECTION (IMAGE QUALITY PRIORITY MODE)

| PHOTOGRAPHIC DISTANCE RANGE | COMPRESSION RATIO SETTING |
|---|---|
| PHOTOGRAPHIC DISTANCE (LONG RANGE) $\geq d_L$ | LOW COMPRESSION RATIO L |
| $d_L >$ PHOTOGRAPHIC DISTANCE $> d_S$ | MEDIUM COMPRESSION RATIO M |
| PHOTOGRAPHIC DISTANCE (CLOSE RANGE) $\leq d_S$ | HIGH COMPRESSION RATIO H |

FIG. 25

COMPRESSION RATIO SELECTION (DATA LENGTH PRIORITY MODE)

| PHOTOGRAPHIC DISTANCE RANGE | COMPRESSION RATIO SETTING |
|---|---|
| PHOTOGRAPHIC DISTANCE (LONG RANGE) $\geq d_L$ | HIGH COMPRESSION RATIO H |
| $d_L >$ PHOTOGRAPHIC DISTANCE $> d_S$ | MEDIUM COMPRESSION RATIO M |
| PHOTOGRAPHIC DISTANCE (CLOSE RANGE) $\leq d_S$ | LOW COMPRESSION RATIO L |

FIG. 30

COMPRESSION RATIO SELECTION (IMAGE QUALITY PRIORITY MODE)

| FOCAL DISTANCE RANGE | COMPRESSION RATIO SETTING |
|---|---|
| FOCAL DISTANCE (SHORT) $\leq f_s$ | LOW COMPRESSION RATIO L |
| $f_s <$ FOCAL DISTANCE $< f_L$ | MEDIUM COMPRESSION RATIO M |
| FOCAL DISTANCE (LONG) $\geq f_L$ | HIGH COMPRESSION RATIO H |

FIG. 31

COMPRESSION RATIO SELECTION (DATA LENGTH PRIORITY MODE)

| FOCAL DISTANCE RANGE | COMPRESSION RATIO SETTING |
|---|---|
| FOCAL DISTANCE (SHORT) $\leq f_s$ | HIGH COMPRESSION RATIO H |
| $f_s <$ FOCAL DISTANCE $< f_L$ | MEDIUM COMPRESSION RATIO M |
| FOCAL DISTANCE (LONG) $\geq f_L$ | LOW COMPRESSION RATIO L |

FIG. 34

COMPRESSION RATIO SELECTION
(IMAGE QUALITY PRIORITY MODE)

| FOCAL DISTANCE RANGE | PHOTOGRAPHIC DISTANCE RANGE | COMPRESSION RATIO |
|---|---|---|
| f 1 | d 3 | LOW |
| f 1 | d 2 | LOW |
| f 1 | d 1 | MEDIUM |
| f 2 | d 3 | LOW |
| f 2 | d 2 | MEDIUM |
| f 2 | d 1 | HIGH |
| f 3 | d 3 | MEDIUM |
| f 3 | d 2 | MEDIUM |
| f 3 | d 1 | HIGH |

FIG. 35

COMPRESSION RATIO SELECTION
(DATA LENGTH PRIORITY MODE)

| FOCAL DISTANCE RANGE | PHOTOGRAPHIC DISTANCE RANGE | COMPRESSION RATIO |
|---|---|---|
| f 1 | d 3 | HIGH |
| f 1 | d 2 | HIGH |
| f 1 | d 1 | MEDIUM |
| f 2 | d 3 | HIGH |
| f 2 | d 2 | MEDIUM |
| f 2 | d 1 | LOW |
| f 3 | d 3 | MEDIUM |
| f 3 | d 2 | MEDIUM |
| f 3 | d 1 | LOW |

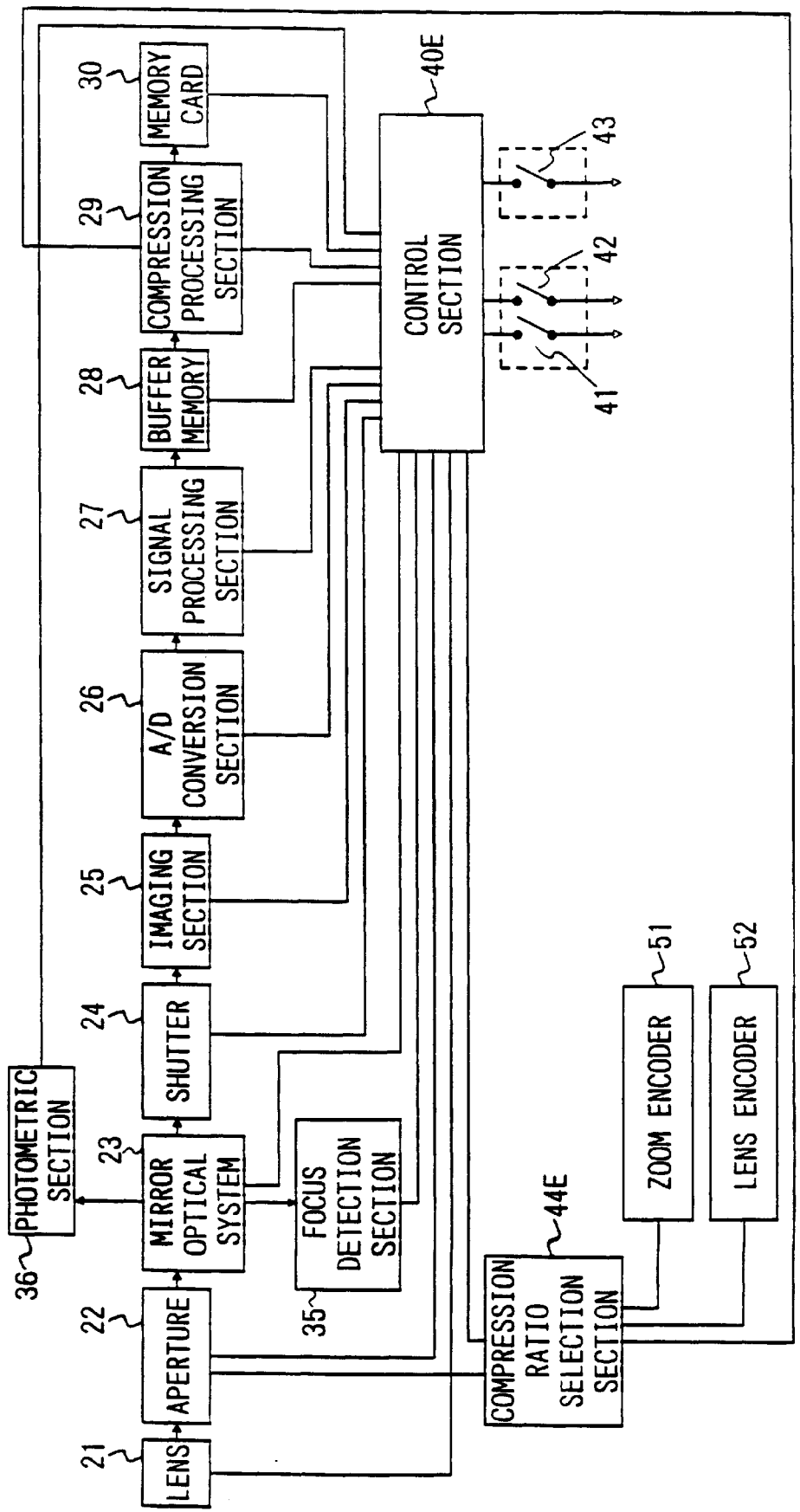

FIG. 38

COMPRESSION RATIO SELECTION
(IMAGE QUALITY PRIORITY MODE)

| FOCAL DISTANCE RANGE | PHOTOGRAPHIC DISTANCE RANGE | APERTURE VALUE RANGE | COMPRESSION RATIO |
|---|---|---|---|
| f 1 | d 3 | F 3 | LOW |
| f 1 | d 3 | F 2 | LOW |
| f 1 | d 3 | F 1 | MEDIUM |
| f 1 | d 2 | F 3 | LOW |
| f 1 | d 2 | F 2 | LOW |
| f 1 | d 2 | F 1 | MEDIUM |
| f 1 | d 1 | F 3 | LOW |
| f 1 | d 1 | F 2 | MEDIUM |
| f 1 | d 1 | F 1 | HIGH |
| f 2 | d 3 | F 3 | LOW |
| f 2 | d 3 | F 2 | LOW |
| f 2 | d 3 | F 1 | MEDIUM |
| f 2 | d 2 | F 3 | LOW |
| f 2 | d 2 | F 2 | MEDIUM |
| f 2 | d 2 | F 1 | HIGH |
| f 2 | d 1 | F 3 | MEDIUM |
| f 2 | d 1 | F 2 | HIGH |
| f 2 | d 1 | F 1 | HIGH |
| f 3 | d 3 | F 3 | LOW |
| f 3 | d 3 | F 2 | MEDIUM |
| f 3 | d 3 | F 1 | HIGH |
| f 3 | d 2 | F 3 | MEDIUM |
| f 3 | d 2 | F 2 | HIGH |
| f 3 | d 2 | F 1 | HIGH |
| f 3 | d 1 | F 3 | MEDIUM |
| f 3 | d 1 | F 2 | HIGH |
| f 3 | d 1 | F 1 | HIGH |

FIG. 39

COMPRESSION RATIO SELECTION
(DATA LENGTH PRIORITY MODE)

| FOCAL DISTANCE RANGE | PHOTOGRAPHIC DISTANCE RANGE | APERTURE VALUE RANGE | COMPRESSION RATIO |
|---|---|---|---|
| f 1 | d 3 | F 3 | HIGH |
| f 1 | d 3 | F 2 | HIGH |
| f 1 | d 3 | F 1 | MEDIUM |
| f 1 | d 2 | F 3 | HIGH |
| f 1 | d 2 | F 2 | HIGH |
| f 1 | d 2 | F 1 | MEDIUM |
| f 1 | d 1 | F 3 | HIGH |
| f 1 | d 1 | F 2 | MEDIUM |
| f 1 | d 1 | F 1 | LOW |
| f 2 | d 3 | F 3 | HIGH |
| f 2 | d 3 | F 2 | HIGH |
| f 2 | d 3 | F 1 | MEDIUM |
| f 2 | d 2 | F 3 | HIGH |
| f 2 | d 2 | F 2 | MEDIUM |
| f 2 | d 2 | F 1 | LOW |
| f 2 | d 1 | F 3 | MEDIUM |
| f 2 | d 1 | F 2 | LOW |
| f 2 | d 1 | F 1 | LOW |
| f 3 | d 3 | F 3 | HIGH |
| f 3 | d 3 | F 2 | MEDIUM |
| f 3 | d 3 | F 1 | LOW |
| f 3 | d 2 | F 3 | MEDIUM |
| f 3 | d 2 | F 2 | LOW |
| f 3 | d 2 | F 1 | LOW |
| f 3 | d 1 | F 3 | MEDIUM |
| f 3 | d 1 | F 2 | LOW |
| f 3 | d 1 | F 1 | LOW |

STILL CAMERA CAPABLE OF EFFICIENTLY SELECTING COMPRESSION RATIO

This application is a division of Ser. No. 08/360,442 filed Dec. 12, 1994, now U.S. Pat. No. 5,619,265.

BACKGROUND OF THE INVENTION

1. Field of the Invention

The present invention relates to a still camera which forms an image of a target object and obtains digital image data, and which then compresses this digital data for storage upon a recording medium.

2. Description of the Related Art

A still camera is per se known from the prior art which records an image of a target object as digital image data upon a recording medium such as a memory card. With this type of still camera, light from the target object is focused by a photographic lens upon a photoelectric conversion element in an imaging section. Analog image data which are photo-electrically converted by the photoelectric conversion element is converted into digital data by an A/D conversion device. Various forms of signal processing are performed upon this digital image data, and the data is then temporarily stored in a buffer memory. This stored data is then compressed and is recorded upon a memory card.

For example, in a still camera disclosed in Japanese Patent Laid-Open Publication Serial No. Heisei 3-205963, the digital image data is compressed by a compression ratio which is suitable in practice, and with which the compression coefficient is selected so that the amount of data after compression should be as small as possible. Alternatively, the compression coefficient may be selected so that the amount of data after compression is always a constant amount.

However, with still cameras of the prior art type described above, the time period from the start of the photographic process until the completion of storage of the image data upon the memory card becomes rather long, and when several photographs are to be taken in sequence (so called sequential photography) it has become a primary factor in preventing increase of speed. Further, the operation of the circuits for data analysis in order to select the compression ratio, and the operation of the compression circuitry, are wasteful of electrical power.

SUMMARY OF THE INVENTION

The objective of the present invention is to provide a still camera which, when automatically selecting the compression coefficient for data compression, can perform the selection of this compression coefficient with a low consumption of electrical power and moreover at high speed.

A still camera according to the present invention comprises: an imaging device which forms an image of an object to be photographed and outputs digital image data; an aperture device which controls the amount of light incident upon said imaging device; a data compression circuit which compresses said image data from said imaging device according to a predetermined compression ratio; and a compression ratio control circuit which controls said compression ratio for said data compression circuit, based upon the aperture value of said aperture device.

It is also acceptable for the compression ratio control circuit to derive the compression ratio, based at least upon a brightness measured by a photometric device.

In order to obtain particular results when performing photography, a memory circuit may be incorporated which stores a plurality of programs which specify relationships between the brightness, and shutter speed and aperture value; and in this case a program setting circuit which sets one from this plurality of programs should also be incorporated, and the compression ratio control circuit should derive and control the compression ratio for the data compression circuit, based upon this one of the plurality of programs set by the program setting circuit.

In this case, the compression ratios can differ between the same aperture values which are the same in different programs. It is possible for the compression ratio to be derived according to whether an image quality priority mode or a data length priority mode is set, and according to whether or not a flash device is actuated to provide illumination. Since each of the programs described above is intended to produce particular results with regard to the image which is photographed, the compression ratio may be determined according to these different desired results. Accordingly, when different ones of the programs are set, the compression ratio is not always the same, even for the same aperture value.

It is also acceptable for the compression ratio control circuit to derive and control the data compression ratio based at least upon the photographic distance to the object to be photographed; or for it to derive and control the data compression ratio based at least upon the focal distance of the photographic lens. It is also acceptable for the compression ratio control circuit to derive and control the data compression ratio based at least upon the photographic distance to the object to be photographed and upon the focal distance of the photographic lens. It is also acceptable for the compression ratio control circuit to derive and control the data compression ratio based at least upon the photographic distance to the object to be photographed, upon the focal distance of the photographic lens, and upon the aperture value of the aperture device. It is desirable to determine the data compression ratio according to the setting of an image quality priority mode or of a data length priority mode.

The amount of image data which is photographed is the greater, the greater is the photographic distance; is the greater, the less is the focal distance; and is the greater, the greater is the aperture value. Accordingly, in the image quality priority mode, in order to give priority to the quality of the image, the compression ratio is reduced. On the other hand, in the data length priority mode, in order to keep the length of the data nearly constant, the compression ratio is increased when the amount of image data is large, and is reduced when the amount of data is small.

BRIEF DESCRIPTION OF THE DRAWINGS

FIG. 5 is a table for explanation of how the compression ratio is selected according to the aperture value during an image quality priority mode;

FIG. 6 is a table for explanation of how the compression ratio is selected according to the aperture value during the data length priority mode;

FIG. 24 is a table for explanation of how the compression ratio is selected according to the photographic distance during an image quality priority mode, in the operation of the fourth preferred embodiment still camera;

FIG. 25 is a table for explanation of how the compression ratio is selected according to the photographic distance during the data length priority mode, in the operation of the fourth preferred embodiment still camera;

FIG. 30 is a table for explanation of how the compression ratio is selected according to the focal distance during an image quality priority mode, in the operation of the fifth preferred embodiment still camera;

FIG. 31 is a table for explanation of how the compression ratio is selected according to the focal distance during the data length priority mode, in the operation of the fifth preferred embodiment still camera;

FIG. 34 is a table for explanation of how the compression ratio is selected according to the photographic distance and the focal distance during an image quality priority mode, in the operation of the sixth preferred embodiment still camera;

FIG. 35 is a table for explanation of how the compression ratio is selected according to the photographic distance and the focal distance during a data length priority mode, in the operation of the sixth preferred embodiment still camera;

FIG. 36 is a block diagram showing the construction of the seventh preferred embodiment of the still camera of the present invention;

is FIG. 38 is a table for explanation of how the compression ratio is selected according to the photographic distance, the focal distance, and the aperture value during an image quality priority mode, in the operation of the seventh preferred embodiment still camera; and:

FIG. 39 is a table for explanation of how the compression ratio is selected according to the photographic distance, the focal distance, and the aperture value during a data length priority mode, in the operation of the seventh preferred embodiment still camera.

DETAILED DESCRIPTION OF THE PREFERRED EMBODIMENTS

First Embodiment

Figure 1:
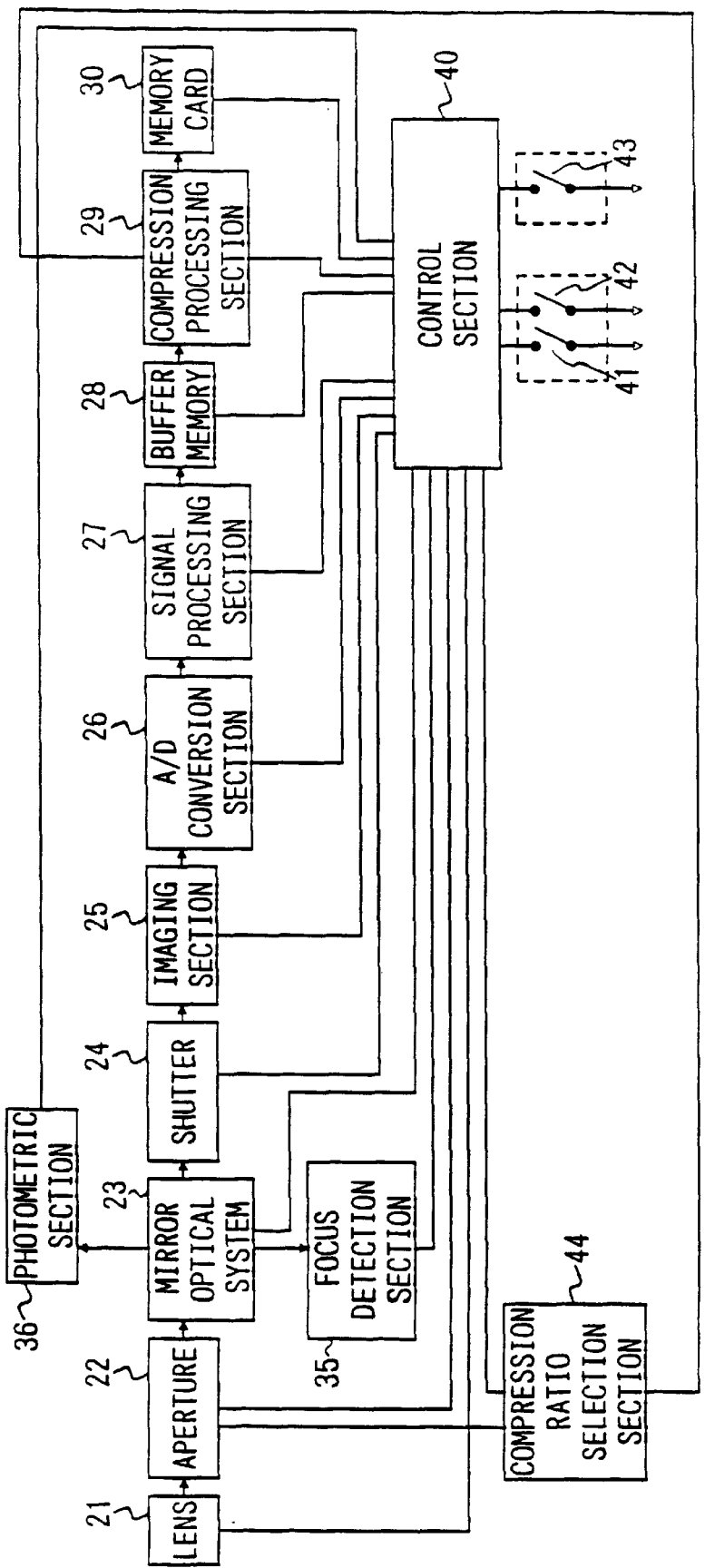
FIG. 1 is a block diagram showing the construction of a still camera which is the first preferred embodiment of the present invention.

FIG. 1 is a block diagram showing the first preferred embodiment of the still camera according to the present invention. The still camera of this embodiment is of a type in which the compression ratio is selected according to the aperture value which has been set. The photographic process is started when a shutter release button, not shown in the figures, is depressed halfway down. First light from the target object passes through a lens 21, and then this light, after being restricted to a suitable amount by an aperture 22, passes via a mirror optical system 23 and via an electronic shutter 24 and is focused into an image upon an imaging section 25. The light from the target object is subjected to photoelectric conversion by this imaging section 25, and then is converted into digital data by an A/D conversion section 26 and is input into a signal processing section 27. The signal processing section 27 executes standard signal processing operations upon this digital data signal, such as for example white balance compensation, amplification, γ compensation, and emphasis of outline or the like, and outputs an image data signal. This image signal is temporarily stored in a buffer memory 28.

When the shutter release button is full depressed, the image signal data stored in the buffer memory 28 is transmitted to a compression processing section 29. After the compression processing section 29 has performed a data compression process upon the signal data, the compressed data is stored in a memory, not particularly shown in the figures, provided on a memory card 30. The process by which the compression ratio for this compression process is selected will be described hereinafter.

The memory card can be loaded into or removed from the body of this still camera. Moreover it would also be possible to utilize a recording medium other than a memory card; for example, a hard disk could be used.

The mirror optical system 23 also directs the light from the target object into a focus detection section 35 and a photometric section 36. The focus detection section 35 performs detection of the focus adjustment state based upon this light from the target object, and outputs the result of the detection to a control section 40. Further, the photometric section 36 performs photometry upon the light from the target object, and outputs the result of the photometry to the control section 40.

The control section 40 comprises a microprocessor or the like, and controls the various above described sections. Furthermore, the control section 40 executes calculations for focusing and for appropriate exposure based upon the results of the detections from the focus detection section 35 and the photometric section 36, and controls the lens 21, the aperture 22, and the shutter 24 based upon the results of these calculations, thereby causing the camera to perform automatic focusing and automatic exposure.

The imaging section 25 of this preferred embodiment comprises an image formation element such as a CCD or the like, and repeatedly at a predetermined time interval converts the light from the target object, which is focused upon this image formation element, into electrical signals so as to output in units of one frame in an analog image data format.

The compression processing section 29 performs a per se known type of quantization calculation and code assignment calculation upon the digital image data, and thereby performs compression of the image data. The compression processing section 29 has a plurality of quantization tables for quantization calculation—in actual concrete terms, has three quantization tables—and the final compression ratio for the data is decided by selecting a particular one of these three quantization tables. In the following, the three compression ratios which correspond to the three quantization tables which can be selected will be respectively designated as the low compression ratio (L), the medium compression ratio (M), and the high compression ratio (H).

The reference numeral 41 denotes a halfway depression switch which is turned on when the shutter release button, not shown, is depressed halfway down, while 42 is a full depression switch which is turned on when the shutter release button is full depressed. Further, 43 is a compression mode setting switch, and this compression mode setting switch 43 being in the on state designates a picture quality priority mode, while its being in the off state designates a data length priority mode.

By this picture quality priority mode is meant a mode in which the compression and storage on the memory card 30 are performed so that the picture quality of the image of the target object formed by the imaging section 25 is preserved as much as possible—in other words while keeping picture quality paramount—, whereby, for picture image data having high picture quality, the picture quality of the played back picture image is ensured to be of as high picture quality as possible. Accordingly, due to the fact that picture image data having high picture quality is compressed at low compression ratio to store on the memory card 30, the image data length for one frame does not remain constant.

On the other hand, by the data length priority mode is meant a mode in which, without any relation to the picture quality of the image of the target object formed by the imaging section 25, the image data length for one frame for storage on the memory card 30 is maintained as constant as possible. Accordingly, due to the fact that even picture image data having high picture quality is compressed at high compression ratio for storage on the memory card 30, it can happen that the picture quality of the played back picture image is somewhat deteriorated in this case.

The reference numeral 44 denotes a compression ratio selection section which includes a microprocessor and the like. The compression ratio selection section 44 sends to the control section 40 a command signal for selection of the appropriate one of the quantization tables in the compression processing section 29, according to the aperture value set for the aperture 22. Thereby selection between the compression ratios is performed, i.e. one of the compression ratios—the low compression ratio, the medium compression ratio, or the high compression ratio—is selected. The details of this compression ratio selection process will be described hereinafter.

Next, referring to the flow charts shown in FIGS. 2 through 4, and with reference to FIGS. 1, 5, and 6, the operation of the camera according to the first preferred embodiment will be explained.

Figure 2:
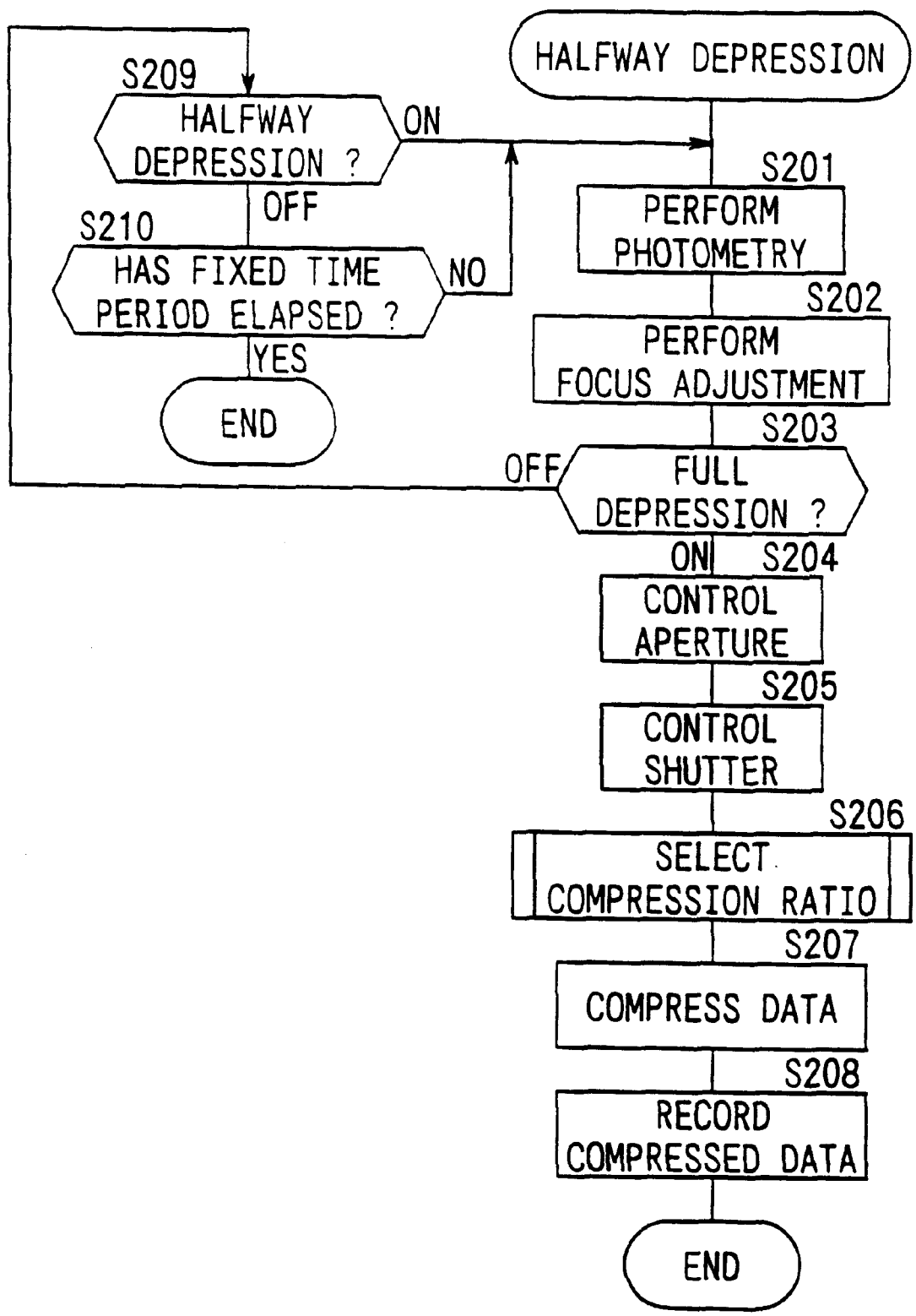
FIG. 2 is a flow chart for explanation of the operation of the first preferred embodiment still camera.

The execution of the program shown in FIG. 2 is commenced when the halfway depression switch 41 is turned on by the shutter release button, not shown in the figures, being depressed halfway down. First, in the step S201, the photometric section 36 is operated so as to perform photometric action upon the light from the target object which is directed upon this photometric section 36 by the mirror optical system 23. The results of this photometric operation are input to the control section 40. In the same manner, in the step S202, the focus detection section 35 is operated so as to perform focus adjustment state detection action upon the light from the target object which is directed upon this focus detection section 35 by the mirror optical system 23, and the control section 40 drives the lens 21 so as to bring it to its focused position, based upon the results of this focus detection process performed by the focus detection section 35.

Next, in the step S203, a decision is made as to whether or not the full depression switch 42 is on. If the full depression switch 42 is in the on state, then the flow of control is transferred to the step S204, while if the full depression switch 42 is in the off state then the flow of control is transferred to the step S209. In this step s209, a decision is made as to whether or not the halfway depression switch 41 is on. If the halfway depression switch 41 is in the on state, then the flow of control returns to the step S201, while if the halfway depression switch 41 is in the off state then the system waits for a fixed time period between the step S209 and the step S210, and if the halfway depression switch 41 is not turned on within this constant time period the operation of this program terminates.

In the step S204 the control section 40 controls the aperture value of the aperture 22, based upon the results of the photometric operation which was performed in the step S201, so as to provide the most desirable exposure, and then in the step S205 the control section 40 controls the driving of the shutter 24. In the step S206 an operation for selection of a compression ratio is performed.

Figure 3:
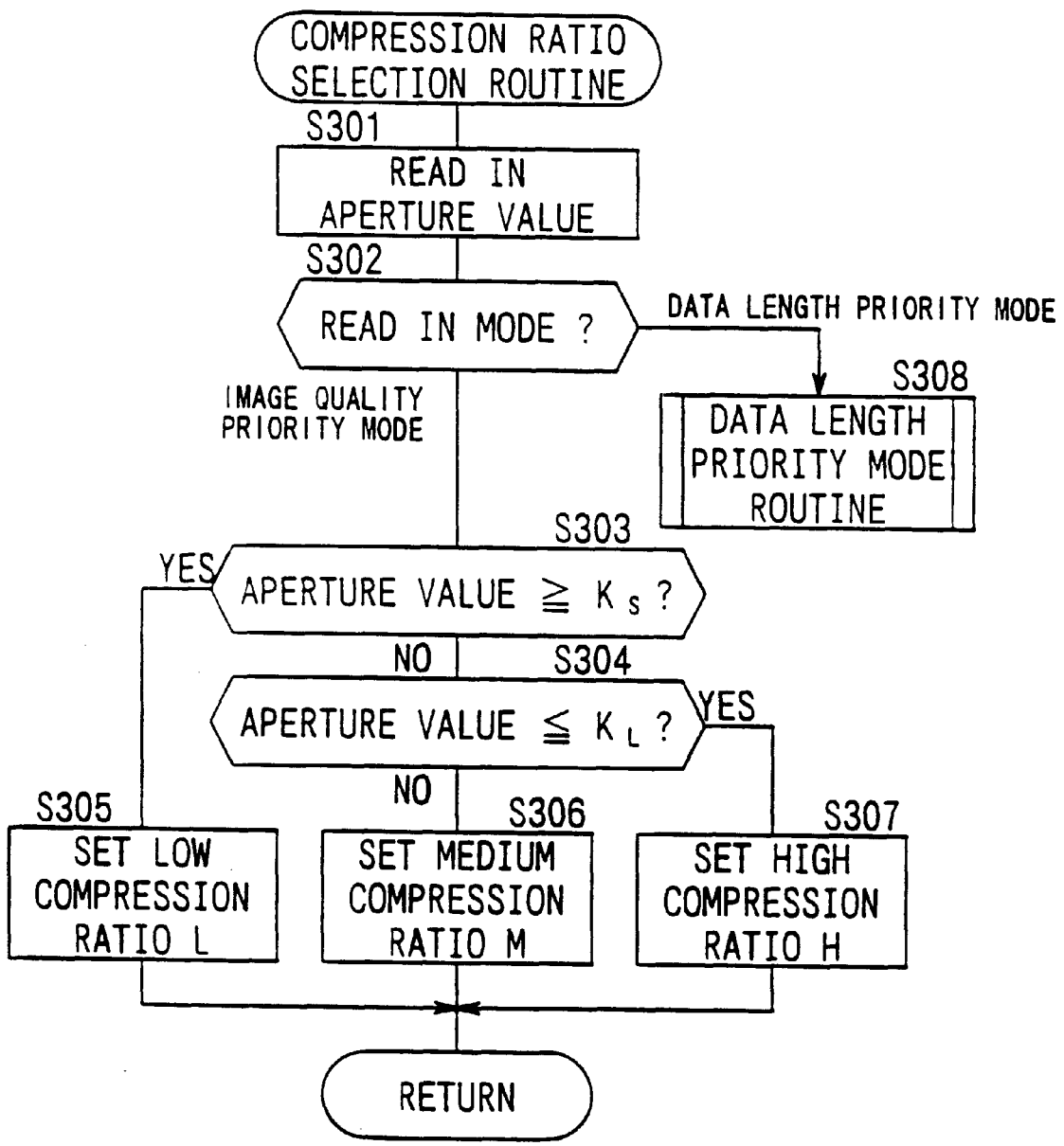
FIG. 3 is a flow chart for explanation of the details of the operation of a compression ratio selection routine.

FIG. 3 is a flow chart showing the details of the operation of this compression ratio selection operation. The program shown in this flow chart is executed by the compression ratio selection section 44. In the step S301 the compression ratio selection section 44 reads in the aperture value of the aperture 22. Next in the step S302 the on or off state of the compression mode setting switch 43 is read in via the control section 40. If the set state of this switch 43 is on, which means that the image quality priority mode is set, then the flow of control is transferred to the step S303. If the set state of this switch 43 is off, which means that the data length priority mode is set, then the flow of control is transferred to the step S308.

In the step S303, a decision is made as to whether or not the aperture value which was read in in the step S301 is greater than or equal to a predetermined constant value $K_S$. If the decision is YES, then the flow of control is transferred to the step S305, while if the decision is NO then the flow of control is transferred to the step S304. In the step S304, a decision is made as to whether or not this aperture value which was read in in the step S301 is less than or equal to a predetermined constant value $K_L$ ($<K_S$). If the decision is YES, then the flow of control is transferred to the step S307, while if the decision is NO then the flow of control is transferred to the step S306.

In the step S305, the low compression ratio L is selected, and a command signal is sent to the control section 40 for selecting the quantization table in order to implement this low compression ratio L. In the step S306, the medium compression ratio M is selected, and a command signal is sent to the control section 40 for selecting the quantization table in order to implement this medium compression ratio M. In the step S307, the high compression ratio H is selected, and a command signal is sent to the control section 40 for selecting the quantization table in order to implement this high compression ratio H. The summary in the foregoing is indicated in the table shown in FIG. 5.

Figure 4:
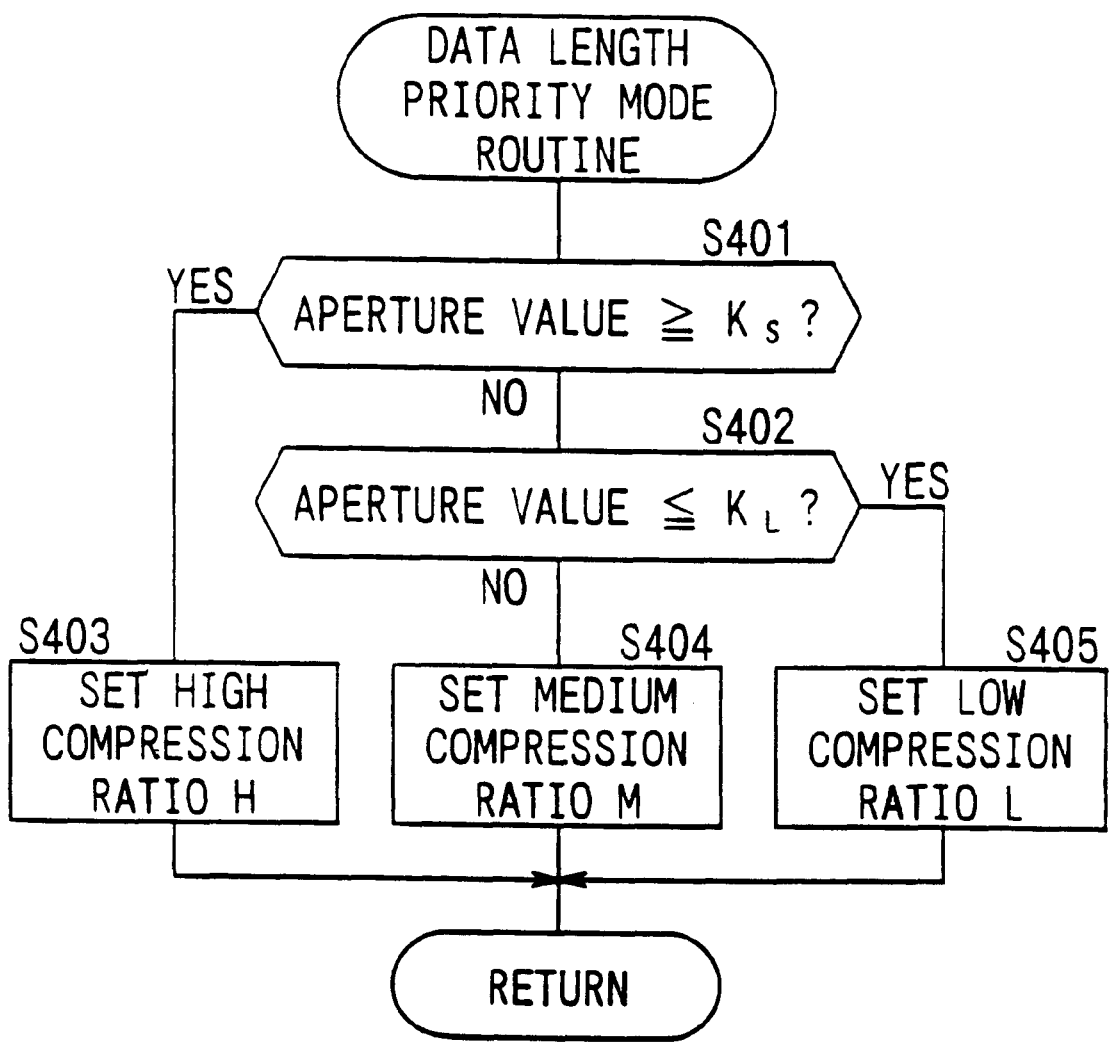
FIG. 4 is a flow chart for explanation of the details of the operation of the compression ratio selection routine during a data length priority mode.

FIG. 4 is a flow chart showing the details of an operation for performing selection of the compression ratio when the data length priority mode is set. This flow chart is executed by the compression ratio selection section 44. First, in the steps S401 and S402, the same operations are performed as in the steps S303 and S304 of the flow chart shown in FIG. 3. If in the step S401 the result of the test is YES, the flow of control is transferred to the step S403, in which the high compression ratio H is selected, and a command signal is sent to the control section 40 for selecting the quantization table in order to implement the high compression ratio H. If in the step S402 the result of the test is YES, the flow of control is transferred to the step S405 in which the low compression ratio L is selected, and a command signal is sent to the control section 40 for selecting the quantization table in order to implement the low compression ratio L. If in the step S402 the result of the test is NO, the flow of control is transferred to the step S404 in which the medium compression ratio M is selected, and a command signal is sent to the control section 40 for selecting the quantization table in order to implement this medium compression ratio M. The summary in the foregoing is indicated in the table shown in FIG. 6.

As seen from the above, in the image quality priority mode, the more tightly the aperture is closed the lower is the compression ratio which is selected; on the contrary, in the data length priority mode, the more tightly the aperture is closed the higher is the compression ratio which is selected. This means that, since the depth of the photographic field is the deeper the more tightly the aperture 22 is closed, so that a higher image quality image is obtained because a relatively larger number of objects to be photographed within the photographic field are in reasonable focus, therefore in the image quality priority mode the action of lowering the compression ratio for high quality image data is performed, in order to obtain high image quality pictures during playback. On the other hand, since the higher is the image quality the longer is the data length even after the compression process, therefore in the data length priority mode the action of raising the compression ratio for high quality image data is performed, in order to keep the data length for one frame stored on the memory card 30 as constant as possible.

Returning to the FIG. 2 flow chart, in the step S207 the compression processing section 29 performs the operation of data compression, at the compression ratio which has been selected in the step S206, upon the image data stored in the buffer memory 28. In the step S208 the compressed image data is stored within the memory, not shown in the figures, provided on the memory card 30.

Second Embodiment

The second preferred embodiment will now be explained with reference to FIGS. 7 through 17.

Figure 7:
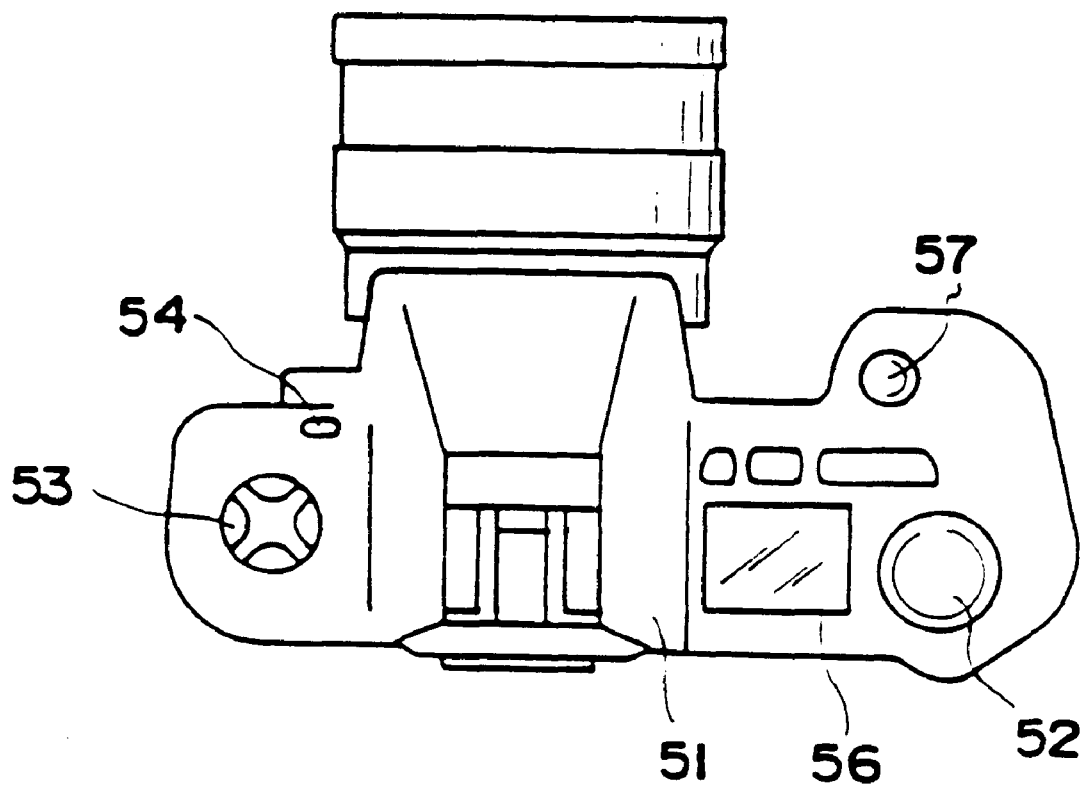
FIG. 7 is a plan view of a still camera which is the second preferred embodiment.

FIG. 7 is a plan view of a still camera which is the second preferred device embodiment. Referring to FIG. 7, fitted to the main body 51 of the camera are externally actuated control members described later. A dial 52 is operated for changing over various items of information. Further, an exposure control mode changeover button 53 is used when selecting a program mode, a shutter priority mode, an aperture priority mode, or a manual mode. And a photographic mode setting button 54 is used when setting the photographic mode for exposure control, such as when performing photography as adapted to various types of photographic circumstances such as portrait or sports or the like. The reference numeral 56 denotes a liquid crystal display which displays the setting states of these various modes, while 57 is a shutter release button.

By rotating the dial 52 while keeping the exposure control mode changeover button 53 depressed, the photographer can select a program mode (P), a shutter priority mode (S), an aperture priority mode (A), or a manual mode (M).

In the program mode, an appropriate shutter speed and an appropriate aperture value are calculated according to a characteristic program line which is stored in advance, based upon the value of the brightness of the object to be photographed as measured by a photometric device described hereinafter. At this time, the set shutter speed and the aperture value can be altered, without varying the set amount of exposure, by rotating the dial 52 while holding the shutter release button 57 depressed halfway down.

When the exposure control mode is the program mode, then it is possible to select any one of the photographic modes which are stored in advance and which will be described hereinafter, by rotating the dial 52 while keeping the photographic mode setting button 54 depressed. These photographic modes stored in advance are modes for which suitable combinations of shutter speed and aperture value are previously programmed for performing photography in order to obtain special types of resulting image. As contrasted with the provision of the previously described program mode in which the characteristic program line is suitable for the normal type of photography, special types of resulting image are obtained with these modes.

In this preferred embodiment, a portrait photography mode, a pan focus mode, a landscape photography mode, a sports mode, a closeup mode, or a silhouette mode can be set.

The portrait photography mode is a mode suitable for photographing compositions made up of a background which is to be kept relatively dim while bringing a human being to relative prominence in the foreground. The pan focus mode is a mode suitable for taking photographs in which not only the object to be photographed but also the background are in focus. The landscape photography mode is a mode suitable for the type of photography which produces sharp photographs with high depth of field. The sports mode is a mode suitable for the type of photography in which the desired result is to freeze an instant of motion. The closeup mode is a mode suitable, when the target object is close up to the camera, for obtaining a photograph which is sharp with a comparatively high depth of field. And the silhouette mode is a mode suitable for producing a resulting photograph in which the object to be photographed is emphasized as a silhouette, such as when performing photography in sunset conditions or the like.

Figure 8:
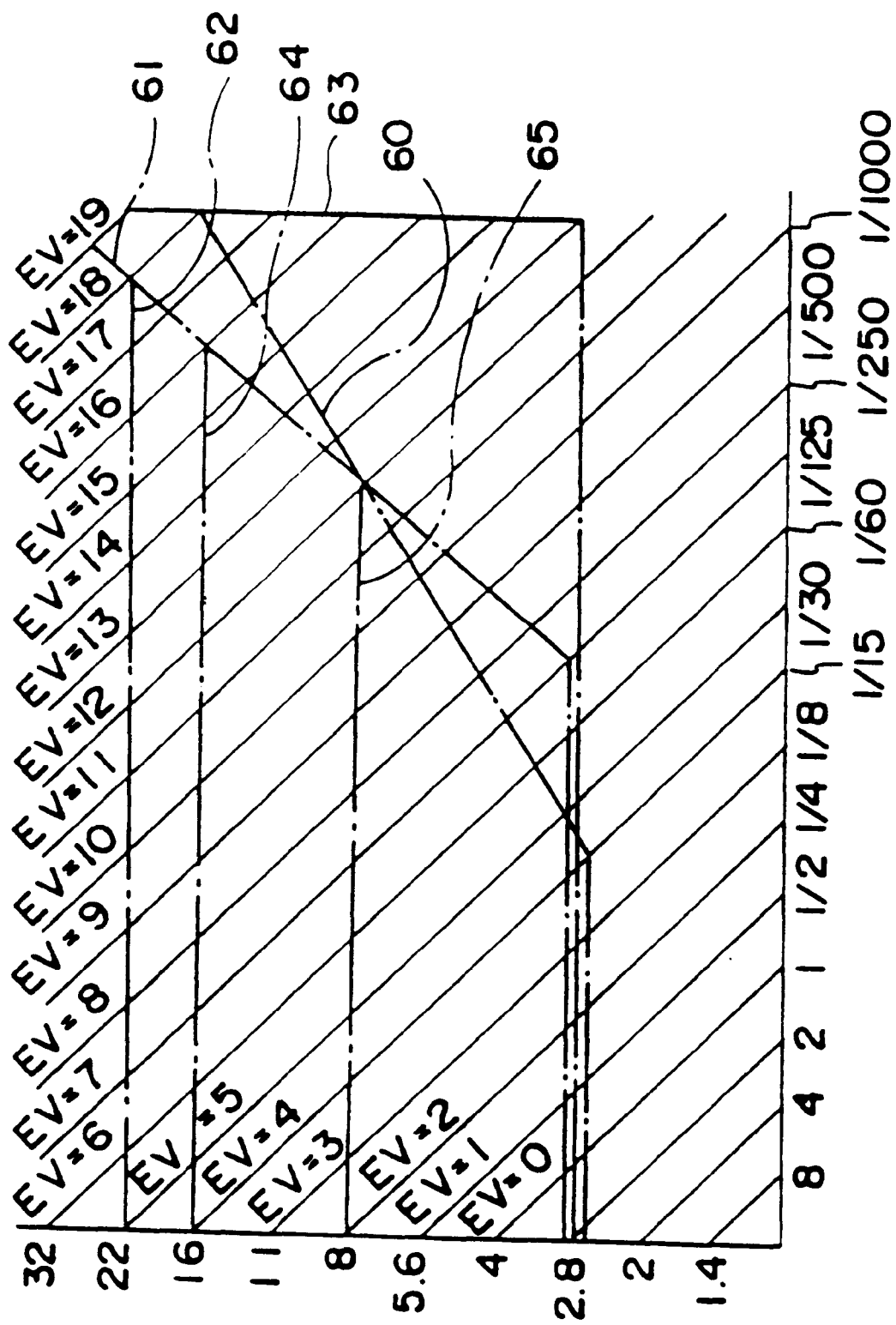
FIG. 8 is a diagram showing various characteristic program lines which are stored in the second preferred embodiment still camera.

Each of the above described program mode and photographic modes, as shown in FIG. 8, is controlled by an individual characteristic program line. The vertical axis in FIG. 8 denotes the aperture value (F-numbers) while the horizontal axis denotes the shutter speed (T). The sloping lines are lines of exposure value EV (Lv value for ISO 100). These characteristic program lines are as determined for a lens of open aperture F2.8.

When the program mode is selected, the shutter speed and the aperture value are controlled according to the characteristic program line 60, which specifies that: for an exposure value EV of from −1 to 4, the shutter speed T is controlled to be from T=15 to T=½ while the aperture value F is controlled to be at F=2.8; and, for an exposure value EV of from 4 to 18, the shutter speed T and the aperture value F are controlled so as to keep the point representing them lying on the straight line which joins the point T=½, F=2.8 and the point T=1/1000, F=16.

When the portrait photography mode is selected, the shutter speed and the aperture value are controlled according to the characteristic program line 61, which specifies that: for an exposure value EV of from −1 to 7, the shutter speed T is controlled to be from T=15 to T=1/15 while the aperture value F is controlled to be at F=2.8; and, for an exposure value EV of from 7 to 19, the shutter speed T and the aperture value F are controlled so as to keep the point representing them lying on the straight line which joins the point T=1/15, F=2.8 and the point T=1/1000, F=32. By doing this, in this portrait photography mode, the result is obtained that the background is kept relatively dim while a human being is brought to relative prominence in the foreground. As will be understood from the program characteristic line 61 in comparison with the other characteristic lines, photography in this portrait photography mode is performed with the aperture relatively much opened, and therefore the amount of data resulting is relatively small.

When the landscape photography mode is selected, the shutter speed and the aperture value are controlled according to the characteristic program line 62, which specifies that: for an exposure value EV of from 5 to 18, the shutter speed T is controlled to be from T=15 to T=1/500 while the aperture value F is controlled to be at F=22; and, for an exposure value EV greater than or equal to 18, the shutter speed T and the aperture value F are controlled to be the same values as the values obtained from the above described characteristic program line 61. By doing this, in this landscape photography mode, the result is obtained that the photograph is sharp and the depth of field is high, and therefore the amount of data resulting is relatively large.

When the sports mode is selected, the shutter speed and the aperture value are controlled according to the characteristic program line 63, which specifies that: for an exposure value EV of from −1 to 13, the shutter speed T is controlled to be from T=15 to T=1/1000 while the aperture value F is controlled to be at F=2.8; and, for an exposure value EV of from 13 to 19, the shutter speed T is controlled to be at T=1/1000 while the aperture value F is controlled to be from F=2.8 to F=22. By doing this, in this sports mode, since the shutter speed is as high as practicable, a stop motion effect is obtained so that an instantaneous position during the motion of a moving target is frozen. On the other hand, since the aperture is controlled to be relatively rather much opened, therefore the amount of data resulting is relatively small.

When the closeup mode is selected, the shutter speed and the aperture value are controlled according to the characteristic program line 64, which specifies that: for an exposure value EV of from 4 to 16, the shutter speed T is controlled to be from T=15 to T=1/250 while the aperture value F is controlled to be at F=16; and, for an exposure value EV of from 16 to 19, the shutter speed T and the aperture value F are controlled to be the same values as the values obtained from the above described characteristic program line 61. By doing this, in this closeup mode, the result is obtained that a sharp photograph is obtained which has a comparatively high depth of field, although being a closeup. Moreover, although the depth of field is relatively great and the image of the principal object to be photographed is very clear so that the data amount in its region is quite large, on the other hand a relatively small difference of the photographic distance causes the background to be out of focus easily, and the amount of data representing this background is small. Accordingly, as a total, the resulting amount of data is relatively small.

When the pan focus mode is selected, the shutter speed and the aperture value are controlled according to the characteristic program line 65, which specifies that: for an exposure value EV of from 2 to 12, the shutter speed T is controlled to be from T=15 to T=1/60 while the aperture value F is controlled to be at F=8; and, for an exposure value EV of from 12 to 19, the shutter speed T and the aperture value F are controlled to be the same values as the values obtained from the above described characteristic program line 61. By doing this, in this pan focus mode, the result is obtained that not only the object to be photographed but also the background are in focus, which is particularly effective for taking commemorative photographs or the like. In this pan focus mode photography is performed with a medium aperture value.

When the silhouette mode is selected, the shutter speed and the aperture value are controlled to be values which is obtained by compensating the exposure values determined according to the characteristic program line 64 for the closeup mode in the minus direction. By doing this, in this silhouette mode, the result is obtained that, a photograph is obtained in which the object to be photographed is emphasized as a silhouette in a background of sunset or the like. Since in this silhouette mode, an image involves the sunset with the silhouette, in the extreme, only red and black, the resulting amount of data is relatively small.

Figure 9:
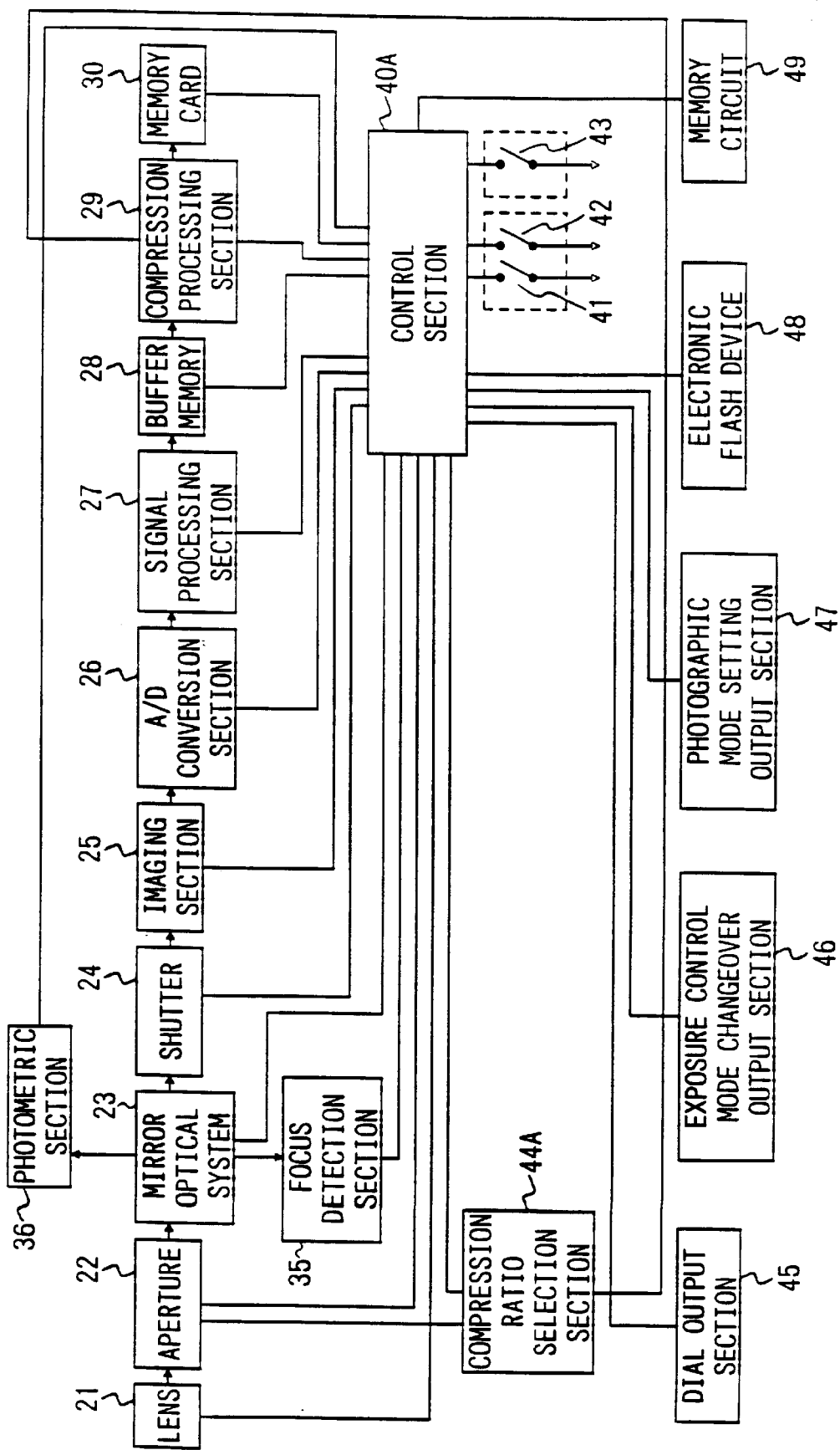
FIG. 9 is a block diagram showing the construction of the second preferred embodiment still camera.

FIG. 9 is a block diagram showing the construction of this still camera according to the second preferred embodiment. Elements which are the same as elements in FIG. 1 are denoted by the same reference numerals, and this explanation will focus upon the points different from FIG. 1.

The halfway depression switch 41 is turned on when the shutter release button 57 is depressed halfway down, while the full depression switch 42 is turned on when the shutter release button 57 is full depressed. The compression ratio selection section 44A sends to the control section 40A a command signal for selection of the one of the quantization tables in the compression processing section 29, according to the exposure control mode, the photographic mode, and whether flash illumination by an flash device is required. Thereby selection between three compression ratios is performed, i.e. one of these compression ratios—a low compression ratio, a medium compression ratio, or a high compression ratio—is selected. The details of this compression ratio selection process will be described hereinafter.

The reference numeral 45 denotes an output section which outputs a signal according to the rotational operation of the above described dial 52, while 46 is an output section which outputs a signal according to the operation of the above described exposure control mode setting button 53, and 47 is, in the same manner, an output section which outputs a signal according to the operation of the photographic mode setting button 54. When the exposure control mode is set to the shutter priority mode or to the manual mode, the shutter speed is set by rotation of the dial 52. Further, when the exposure control mode is set to the aperture priority mode or to the manual mode, the aperture value is set by rotation of the dial 52.

An electronic flash device 48 is a flash device which is provided for supplying illumination for the object to be photographed, and either may be of a type which is internal to the main body of the camera or may be of the external accessory type. The control section 40A can determine whether or not the electronic flash device 48 has yet attained the condition of being ready to provide flash illumination by engaging in communication therewith.

The reference numeral 49 denotes a memory circuit in which the various characteristic program lines shown in FIG. 8 are stored, and, according to the currently set program mode and the currently set photographic mode, one characteristic program line is selected from this plurality of characteristic program lines stored in the memory circuit 49. The shutter speed and the aperture are read out according to this selected characteristic program line, based upon the brightness previously measured.

Next, the operation of the camera according to this preferred embodiment will be explained. The main program is the same as for the still camera according to the first preferred embodiment, and accordingly only its step S206, in which the data compression ratio is selected, will be particularly described.

Figure 10:
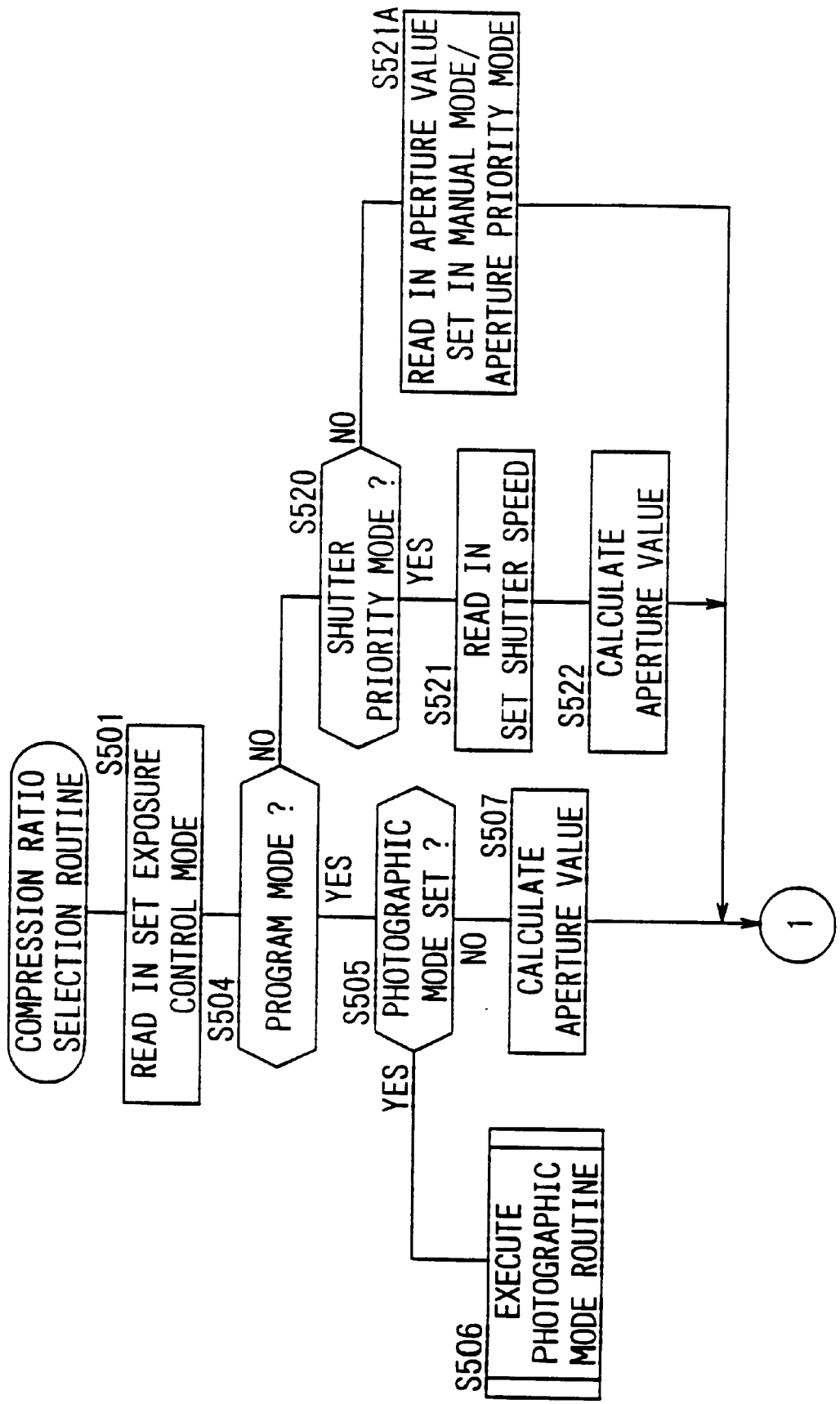
FIG. 10 is a flow chart showing the details of the operation of a compression ratio selection routine employed in the second preferred embodiment still camera.
Figure 11:
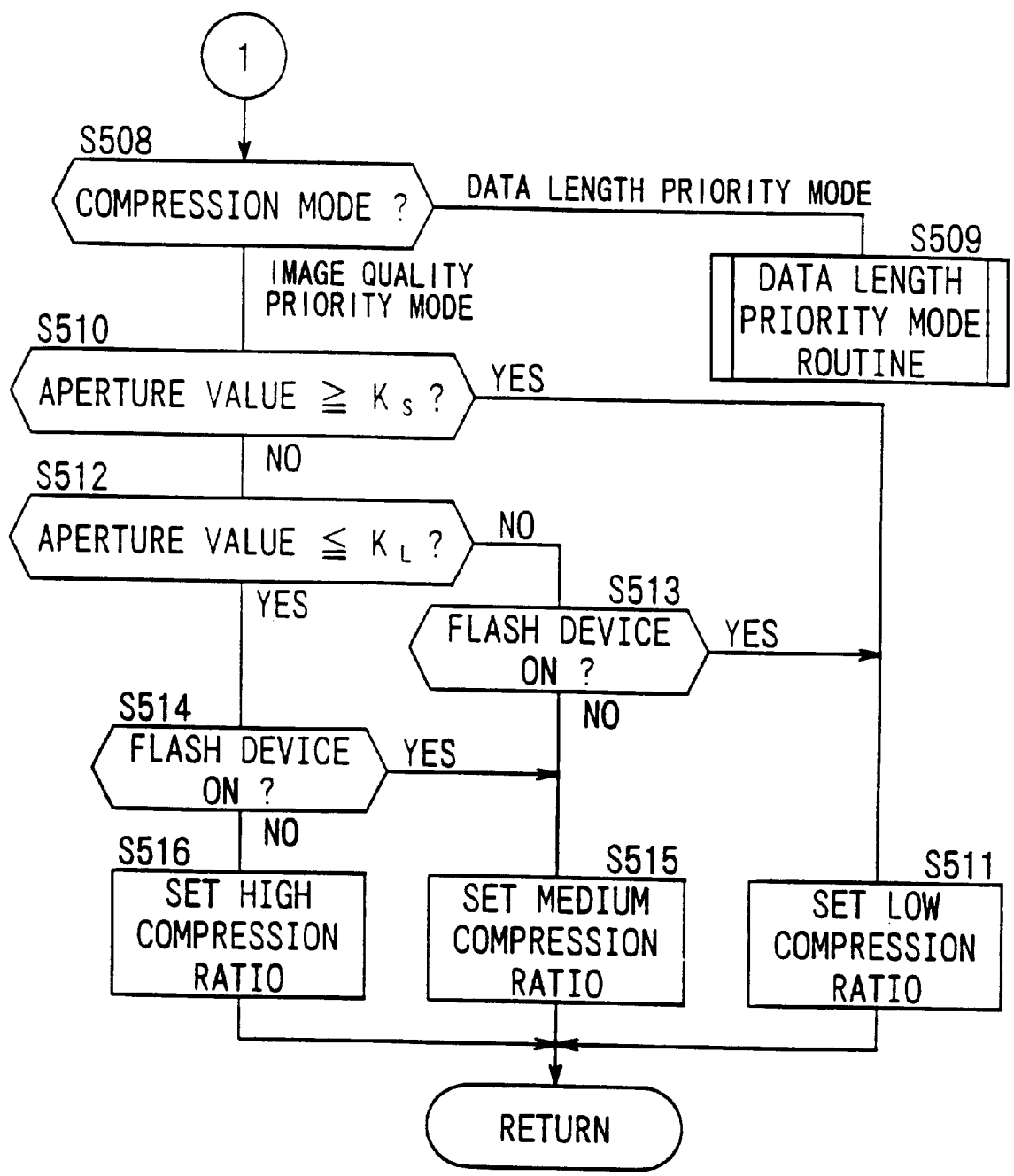
FIG. 11 is a flow chart following FIG. 10.

FIGS. 10 and 11 are flow charts which particularly show the details for selecting the compression ratio. The program shown in these flow charts is executed in the compression ratio selection section 44A.

In the step S501, the set exposure control mode is read in, and then the flow of control proceeds to the step S504. In the step S504, a decision is made as to whether or not the exposure control mode read in in the step S501 is the program mode, and if the decision is YES then the flow of control is transferred to the step S505, while if the decision is No then the flow of control is transferred to the step S520.

In the step S505, a decision is made as to whether or not a photographic mode is set. If the decision is YES, then the program goes to the step S506 in which the set photographic mode is read in and the setting of the compression ratio is performed in the procedures described hereinafter. If the decision is NO, then the flow of control is transferred to the step S507. In this step S507, a shutter speed and an aperture value are calculated using the characteristic program line 60 which has been stored in the control section 40A in advance, based upon the photometric value which was measured in the step S201, and then the flow goes to the step S508 of the FIG. 11. The processing in the step S508 will be described hereinafter.

In the step S520 a decision is made as to whether or not the set exposure control mode read in in the step S501 is the shutter priority mode. If the decision is YES then the flow goes to the step S521, while if the decision is NO then the flow goes to the step S521A. In the step S521, the shutter speed which has been set by the operation of the dial 52 is read in. In the step S522 an appropriate aperture value is calculated, based upon the shutter speed setting read in in the step S521 and upon the photometric value which was measured in the step S201, and then the flow of control proceeds to the step S508 of the FIG. 11. In the step S521A, the set aperture value in the manual mode or the aperture mode is read in and then the flow of control proceeds to the step S508.

In the step S508 of FIG. 11, a decision is made from the setting of the compression mode setting switch 43 as to whether the image quality priority mode or the data length priority mode is set. If the image quality priority mode is set, then the flow goes to the step S510. If the data length priority mode is set, then the flow goes to the step S509.

In the step S510, a decision is made as to whether or not the aperture value previously calculated is greater than or equal to a predetermined constant value $K_S$. If the decision is YES, the low compression ratio is selected in the step S511, and a command signal is sent to the control section 40A for selecting the appropriate quantization table in order to implement this low compression ratio. If the decision is No then the flow goes to the step S512. In the step S512, a decision is made as to whether or not this calculated aperture value is less than or equal to a predetermined constant value $K_L$. If the decision is NO then the flow goes to the step S513, while if the decision is YES then the flow goes to the step S514.

In the step S513, a signal is input from the electronic flash device 48. If the electronic flash device 48 is on, then the flow goes to the step S511 and the low compression ration is selected. On the other hand, if the flash device 48 is off, then the flow goes to the step S515 in which the medium compression ratio is selected, and a command signal is sent to the control section 40A for selecting the quantization table in order to implement this selected compression ratio. In the step S514, a signal is input from the electronic flash device 48. If the electronic flash device 48 is on, then the flow goes to the step S515 and the medium compression ratio is selected. On the other hand, if the flash device 48 is off, then the flow goes to the step S516 in which the high compression ratio is selected, and a command signal is sent to the control section 40A for selecting the quantization table in order to implement this selected compression ratio.

Figure 12:
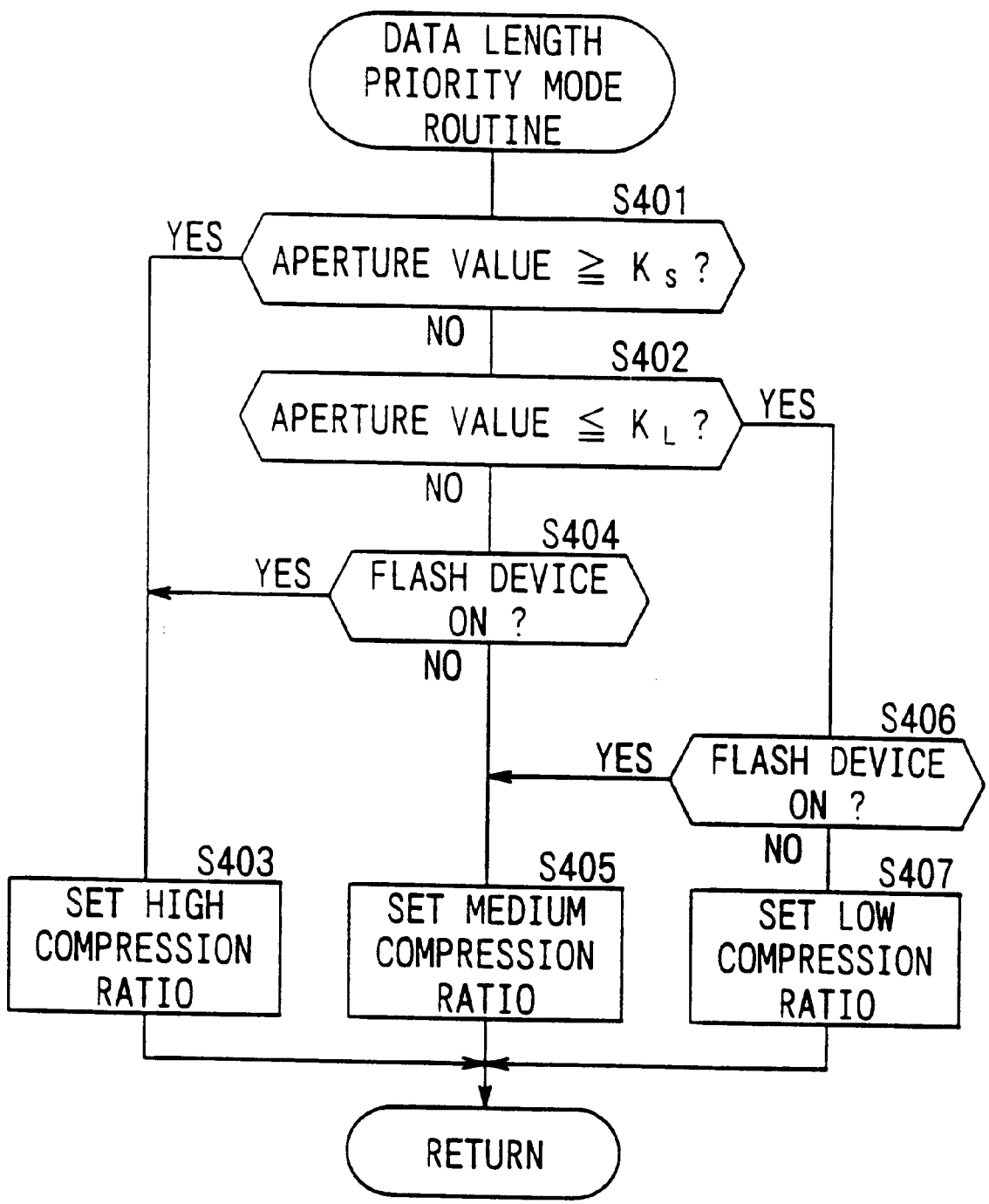
FIG. 12 is a flow chart for explanation of the example of the operation of the compression ratio selection routine during a data length priority mode in the second preferred embodiment still camera.

FIG. 12 is a flow chart showing the details of the operation for selection of the compression ratio when the data length priority mode is set in the step S509 of FIG. 11. This flow chart is executed in the compression ratio selection section 44A. First, in the steps S401 and S402, the same operations are performed as in the steps S510 and S512 of the flow chart in FIG. 11. If in the step S401 the decision is YES, the flow goes to the step S403 in which the high compression ratio is selected and a command signal is sent to the control section 40A for selecting the quantization table in order to implement this high compression ratio. If the decision in the step S402 is YES, then the flow goes to the step S406.

In this step S406, a signal is input from the electronic flash device 48. If the electronic flash device 48 is on then the flow of control is transferred to the step S405, and the medium compression ratio is selected, while if the flash device 48 is off then the flow goes to the step S407, and the low compression ratio is selected. A command signal is sent to the control section 40A for selecting the quantization table in order to implement the selected compression ratio.

If the decision in the step S402 is NO so that the flow goes to the step S404. In the step S404, a signal is input from the electronic flash device 48. If the flash device 48 is on then the flow goes to the step S403 and the high compression ratio is selected. If the flash device 48 is off, then the flow goes to the step S405, and the medium compression ratio is selected. A command signal is sent to the control section 40A for selecting the quantization table in order to implement the selected compression ratio.

In the program mode, the compression ratio is basically determined according to the aperture value. In detail, in the program mode with the picture quality priority mode, if the aperture value is greater than or equal to $K_S$, i.e. in the case that the aperture is relatively much closed, because the picture which has been taken has relatively fine detail and the amount of resulting data is relatively large, accordingly the compression is performed with a low compression ratio so that thereby the original image can be faithfully recreated. If the aperture value is less than or equal to $K_L$, i.e. in the case that the aperture is relatively much opened, then the picture which has been taken is not particularly finely detailed and naturally the amount of resulting data is quite small, but if the photography with electronic flash is performed then the amount of data tends to be increased because the contrast is enhanced. Accordingly, in this case, the data compression process is performed with the medium compression ratio. If photography without electronic flash is performed then the compression is performed with the high compression ratio, in order to economize the space upon the memory card. If the aperture value is less than $K_S$ but greater than $K_L$, i.e. in the case of a medium aperture value, then the compression is performed with the medium compression ratio if flash was not used for taking the photograph, but if flash was used then the compression is performed with the low compression ratio.

In the program mode with the data length priority mode, if the aperture value is greater than or equal to $K_S$ and the amount of resulting data is relatively large, the compression is performed with the high compression ratio, so that the data length for the recorded picture corresponds to a value which was previously determined. If the aperture value is less than or equal to $K_L$ then the amount of resulting data in photography with flash becomes large that those in photography without flash. Accordingly, in this case, the data compression process is performed with the medium compression ratio if flash was not used for taking the photograph, but if flash was used then the compression is performed with the low compression ratio. If the aperture value is less than $K_S$ but greater than $K_L$, i.e. in the case of a medium aperture value, then the compression is performed with the medium compression ratio if flash was not used for taking the photograph, but if flash was used then the compression is performed with the high compression ratio.

FIGS. 13 through 17 are flow charts showing the procedure in the step S506 of FIG. 10 in detail, that is the procedure for a compression ratio selection.

(Portrait Mode)

Figure 13:
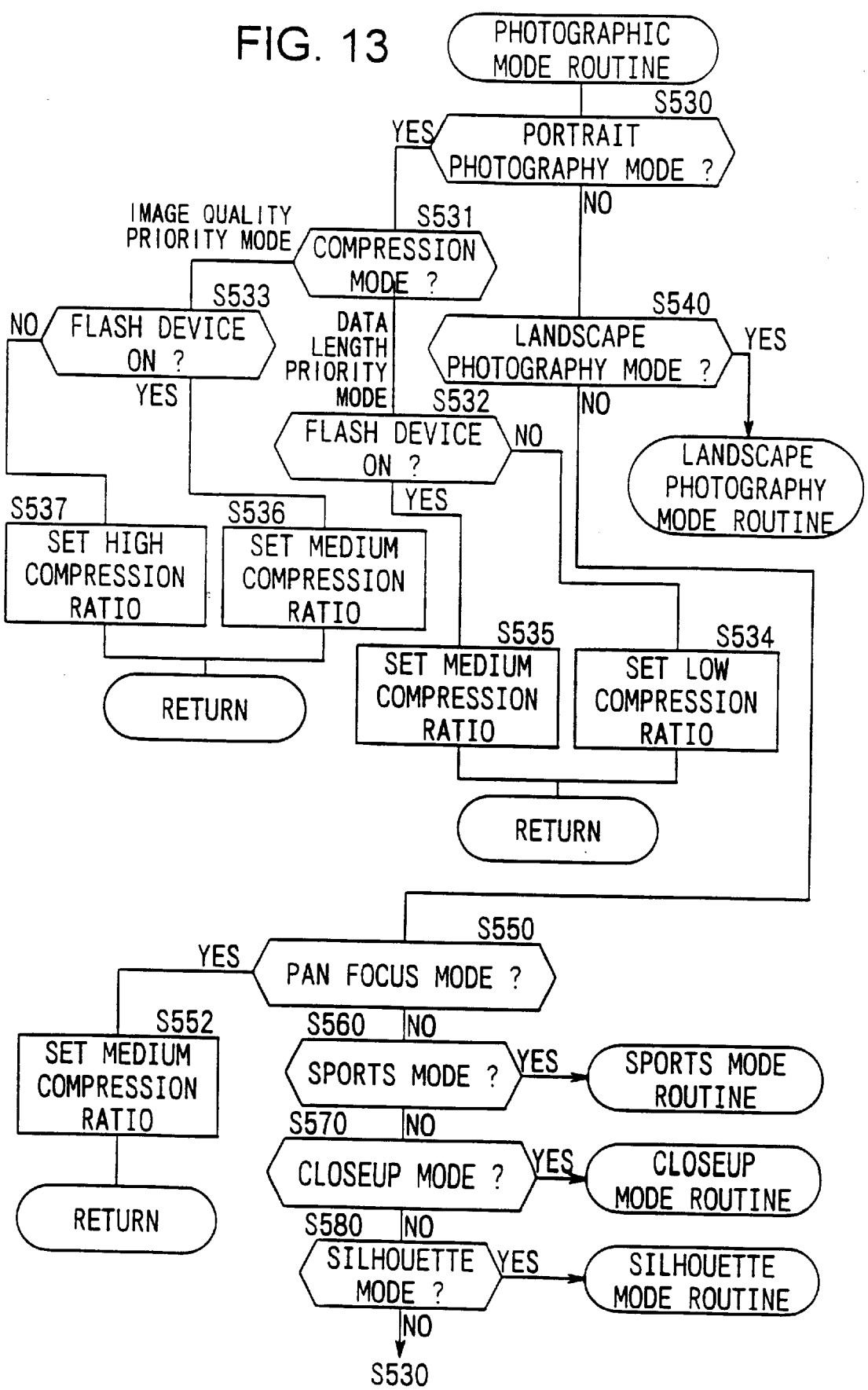
FIG. 13 is a flow chart for explanation of the example of the operation of the compression ratio selection routine according to a photographic mode in the second preferred embodiment still camera.

In the step S530 of FIG. 13 a decision is made as to whether or not the photographic mode read out is the portrait mode. If the decision is YES, then the flow goes to the step S531, while if the decision is NO then the flow goes to the step S540. In the step S531, a decision is made from the setting of the compression mode setting switch 43 as to whether the image quality priority mode or the data length priority mode is set. If the image quality priority mode is set, then the flow goes to the step S533. On the other hand, if the data length priority mode is set, then the flow goes to the step S532.

In the step S532 for the data length priority mode, a signal is input from the electronic flash device 48. If the electronic flash device 48 is on, the medium compression ratio is selected, and a command signal is sent to the control section 40A for selecting the quantization table in order to implement this medium compression ratio. On the other hand, if the flash device 48 is off, the low compression ratio is selected, and a command signal is sent to the control section 40A for selecting the quantization table in order to implement this low compression ratio.

In the step S533 for the image quality priority mode, a signal is input from the electronic flash device 48. If the electronic flash device 48 is on, the medium compression ratio is selected in the step S536, and a command signal is sent to the control section 40A for selecting the quantization table in order to implement this medium compression ratio. On the other hand, if the flash device 48 is off, the high compression ratio is selected in the step S537, and a command signal is sent to the control section 40A for selecting the quantization table in order to implement this high compression ratio.

In the portrait photography, photography is performed with the aperture relatively wide open. If photography with flash is performed the contrast is increased and the amount of data therefore becomes larger. Therefore, when giving the priority to image quality, the compression ratio is set to be lower as compared with photography without flash in such a manner that a finely detailed image can be obtained. On the other hand, when it is desired to keep the length of the recorded data constant, because the amount of data for flash photography is greater, the compression ratio is set to be greater at this time, as compared with non-flash photography.

In the step S540, a decision is made as to whether or not the photographic mode read out in the step S506 is the landscape photography mode. If the decision is YES, then the flow of control is transferred to the step S541 (FIG. 14), while if the decision is NO then the flow of control is transferred to the step S550.

(Landscape Photography Mode)

Figure 14:
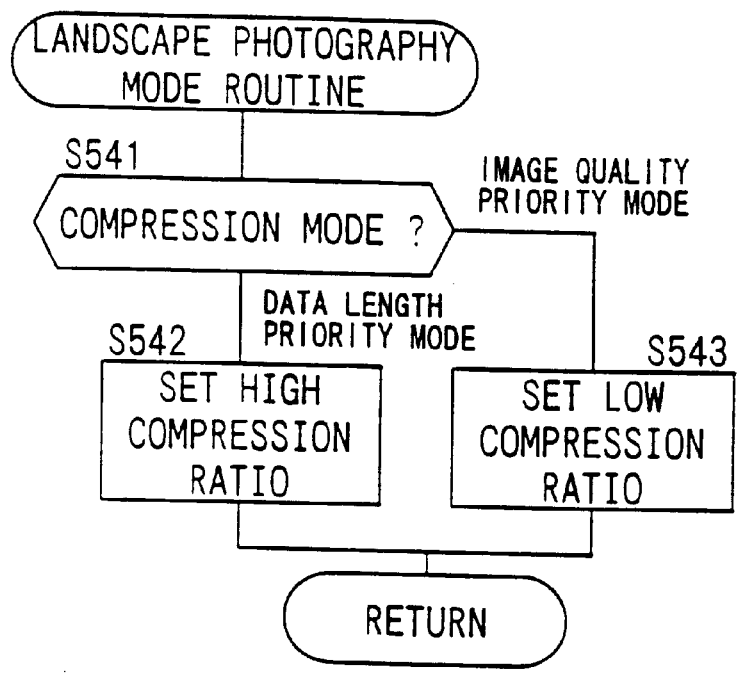
FIG. 14 is a flow chart following FIG. 13.

In the step S541 of FIG. 14, a decision is made from the setting of the compression mode setting switch 43 as to whether the image quality priority mode or the data length priority mode is set. If the data length priority mode is set, the high compression ratio is selected in the step S542, and a command signal is sent to the control section 40A for selecting the quantization table in order to implement this high compression ratio. On the other hand, if the image quality priority mode is set, the low compression ratio is selected in the step S543, and a command signal is sent to the control section 40A for selecting the quantization table in order to implement this low compression ratio.

Because, in comparison with a photograph which has been taken in the portrait mode, the aperture is more on the restricted side for a photograph which has been taken in this landscape photography mode, in principle the amount of data is greater and the picture is sharper. Accordingly, when priority is being given to image quality a low compression ratio is used for recording of the data. On the contrary, when an attempt is being made to keep the length of the compressed digital data for each photography equal to each other, since the amount of data is greater as compared with the portrait mode, a high compression ratio is used for the data recording.

(Pan Focus Mode)

In the step S550 of FIG. 13, a decision is made as to whether or not the photographic mode read out in the step S506 is the pan focus mode. If the decision is YES, then the flow goes to the step S552, while if the decision is NO then the flow goes to the step S560. In the step S552, the medium compression ratio is selected, and a command signal is sent to the control section 40A for selecting the quantization table in order to implement this medium compression ratio.

Because the aperture value is medium when taking a photograph in this pan focus mode, and the amount of data is also medium as compared with a photograph taken in the portrait mode or a photograph taken in the landscape photography mode, a medium compression ratio is used for the data recording, both in the data length priority mode and in the image quality priority mode, without any dependence upon whether flash illumination was used or not.

(Sports Mode)

In the step S560 of FIG. 13, a decision is made as to whether or not the photographic mode read out in the step S506 is the sports mode. If the decision is YES, then the flow goes to the step S561 (FIG. 15), while if the decision is NO then the flow goes to the step S570.

Figure 15:
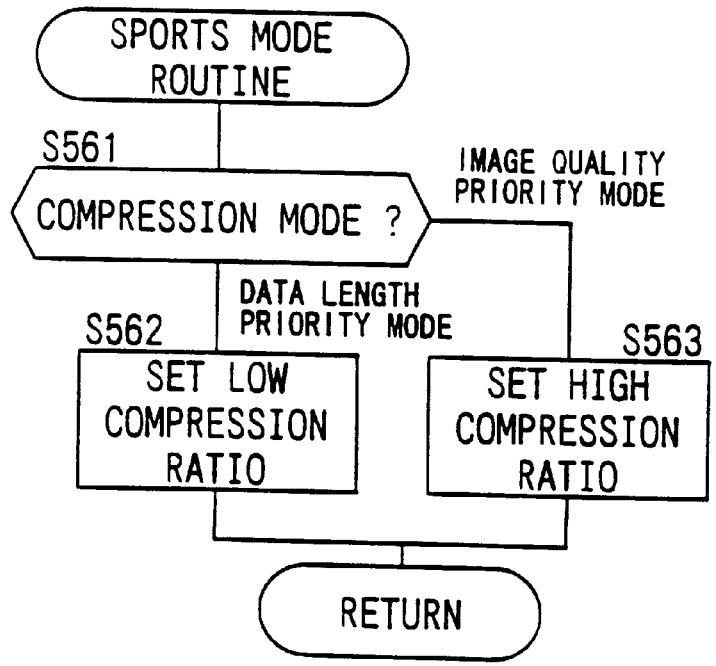
FIG. 15 is a flow chart following FIG. 13.

In the step S561 of FIG. 15, a decision is made from the setting of the compression mode setting switch 43 as to whether the image quality priority mode or the data length priority mode is set. If the data length priority mode is set, the low compression ratio is selected in the step S562, and a command signal is sent to the control section 40A for selecting the quantization table in order to implement this low compression ratio. On the other hand, if the image quality priority mode is set, the high compression ratio is selected in the step S563, and a command signal is sent to the control section 40A for selecting the quantization table in order to implement this high compression ratio.

Because for a photograph which has been taken in this sports mode the aperture is more on the opened up side, in principle the amount of data is less and the image is not of high picture quality. Accordingly, even when the image quality priority mode is selected, a high compression ratio is used for recording of the data, in order to conserve storage capacity upon the memory card 30. On the other hand in the data length priority mode a low compression ratio is used for the data recording, in order to keep the length of the compressed data equal to the length in other photographic modes.

(Closeup Mode)

In the step S570 of FIG. 13, a decision is made as to whether or not the photographic mode read out in the step S506 is the closeup mode. If the decision is YES, then the flow goes to the step S571 (FIG. 16), while if the decision is NO then the flow goes to the step S580.

Figure 16:
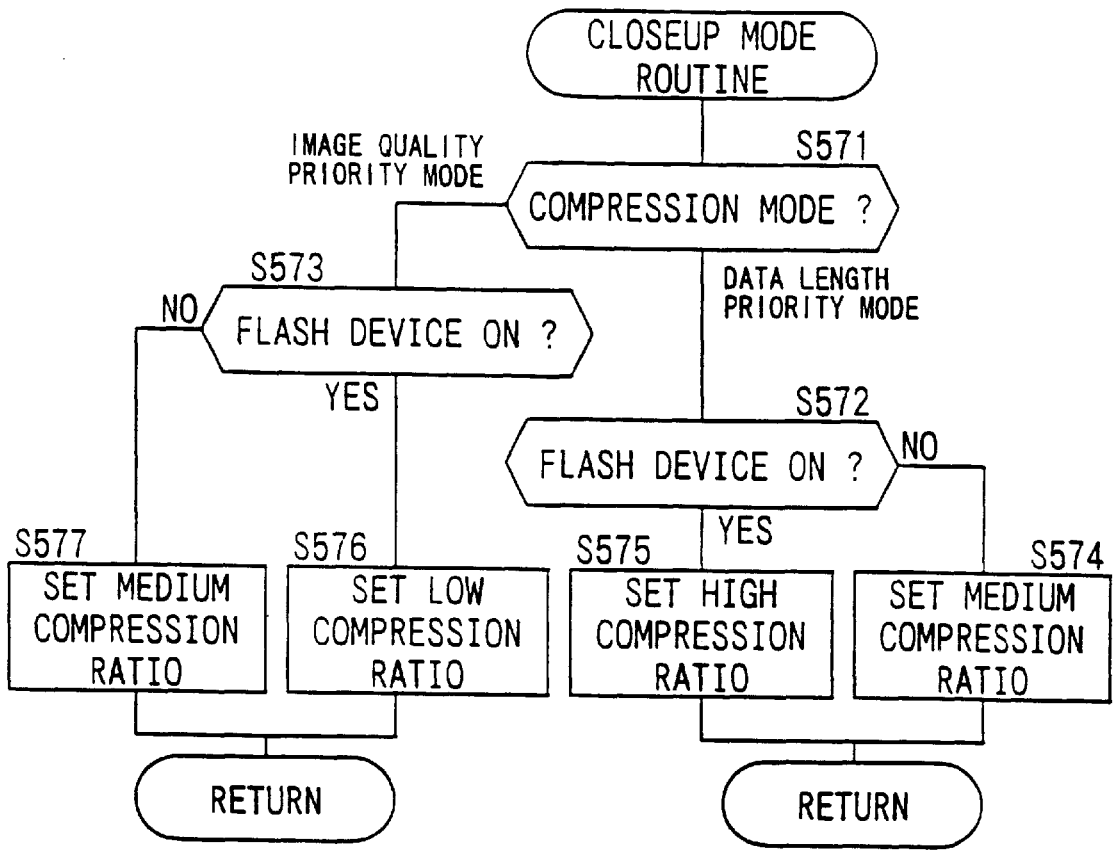
FIG. 16 is a flow chart following FIG. 13.

In the step S571 of FIG. 16, a decision is made from the setting of the compression mode setting switch 43 as to whether the image quality priority mode or the data length priority mode is set. If the data length priority mode is set, then the flow goes to the step S572. On the other hand, if the image quality priority mode is set, then the flow goes to the step S573.

In the step S572, a signal is input from the electronic flash device 48. If the electronic flash device 48 is on, the high compression ratio is selected in the step S575, and a command signal is sent to the control section 40A for selecting the quantization table in order to implement this high compression ratio. On the other hand, if the flash device 48 is off, the medium compression ratio is selected in the step S574, and a command signal is sent to the control section 40A for selecting the quantization table in order to implement this medium compression ratio.

In the step S573, a signal is input from the electronic flash device 48. If the electronic flash device 48 is on, the low compression ratio is selected in the step S576, and a command signal is sent to the control section 40A for selecting the quantization table in order to implement this low compression ratio. On the other hand, if the flash device 48 is off, the medium compression ratio is selected in the step S577, and a command signal is sent to the control section 40A for selecting the quantization table in order to implement this medium compression ratio.

In the closeup mode, as compared with the portrait mode, photography is performed with the aperture rather more closed down, so that the amount of the data is greater than with the portrait mode. Therefore, in the image quality priority mode, with non-flash photography, a medium compression ratio is employed (whereas in the portrait mode a high compression ratio would be used), while if flash photography is performed, since the contrast is relatively higher and the amount of the data is greater, a low compression ratio is employed (whereas in the portrait mode a medium compression ratio would be used). Further, in the data length priority mode, with non-flash photography, a medium compression ratio is employed (whereas in the portrait mode a low compression ratio would be used), while if flash photography is performed a high compression ratio is employed (whereas in the portrait mode a medium compression ratio would be used).

Further, in this closeup mode, as compared with the landscape photography mode, photography is performed with the aperture slightly more opened up, so that the depth of field is great and, in principle, the amount of the data must be as great as with the landscape photography mode. However, since the photographic distance is shorter as compared with the landscape photographic mode, when comparing with the increase in the amount of data due to closing the aperture down, the reduction in the amount of data due to the background out of focus is greater. Accordingly, the data amount is less than in the landscape mode, and the compression ratios are therefore set as described above, according to whether the data length priority mode or the image quality priority mode is set, and according to whether or not flash is used. I.e., for photography in this closeup mode, the compression ratio is decided upon while taking into account the influence, upon the data amount, not only of the aperture but also of the photographic distance.

In the step S580 of FIG. 13, a decision is made as to whether or not the photographic mode read out in the step S506 is the silhouette mode. If the decision is YES, then the flow goes to the step S581 (FIG. 17), while if the decision is NO then the flow goes to the step S530.

Figure 17:
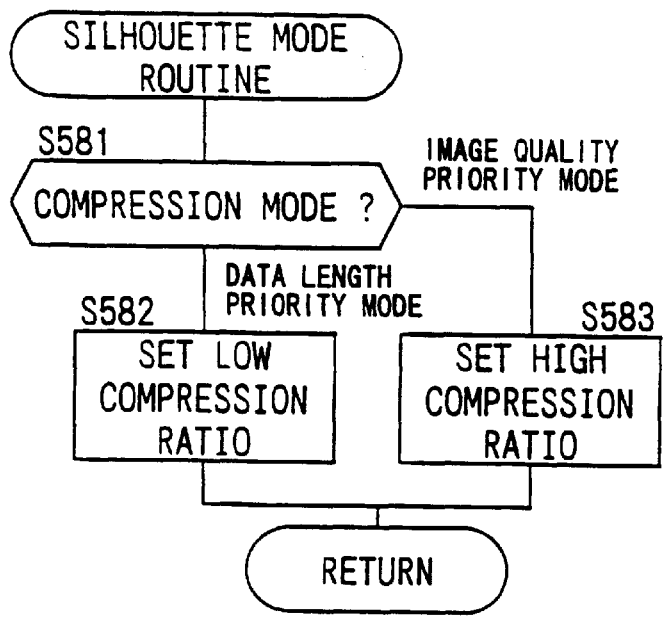
FIG. 17 is a flow chart following FIG. 13.

In the step S581 of FIG. 17, a decision is made from the setting of the compression mode setting switch 43 as to whether the image quality priority mode or the data length priority mode is set. If the data length priority mode is set, the low compression ratio is selected in the step S582, and a command signal is sent to the control section 40A for selecting the quantization table in order to implement this low compression ratio. On the other hand, if the image quality priority mode is set, the high compression ratio is selected in the step S583, and a command signal is sent to the control section 40A for selecting the quantization table in order to implement this high compression ratio.

For a photograph which has been taken in this silhouette mode, because the aperture value is set at the value which is smaller by several steps than the aperture value in the closeup mode and a silhouette against a sunset is portrayed, the amount of data is relatively small. Accordingly, in the data length priority mode a low compression ratio is used.

In this manner, the selection of a compression ratio which is different according to the photographic mode can be able to be used on the basis of the property that in principle the depth of field becomes the greater the greater is the amount by which the aperture is squeezed down and accordingly the focus is correct for a large number of objects to be photographed within the photographic field, so that a high image quality picture is obtained. By taking advantage of this property, in the image quality priority mode, in principle, the action of reducing the compression ratio is performed for high image quality image data, in order to obtain a high quality image when playback. On the other hand, since the better the image quality becomes the greater is the amount of image data, in order that in the data length priority mode the length of the data which is to be stored on the memory card 30 for one frame is to be kept as constant as possible, for high quality image data the action of increasing the compression ratio is performed.

Further, because in the portrait mode and in the closeup mode basically the amount of data is relatively small, even in the image quality priority mode the compression ratio is set to the high compression ratio or to the medium compression ratio; but if flash photography is performed, since the contrast is increased and accordingly the amount of data is increased, in order to be able to recreate a faithful image, the compression ratio is reduced, as compared with the case when non-flash photography is performed. By contrast, in the data length priority mode, the compression ratio for photography using flash is higher as compared with the compression ratio for photography not using flash, with the aim of keeping the length of the data constant.

Accordingly, the same advantages and benefits are obtained with this second preferred embodiment as with the first preferred embodiment.

Third Embodiment

Figure 18:
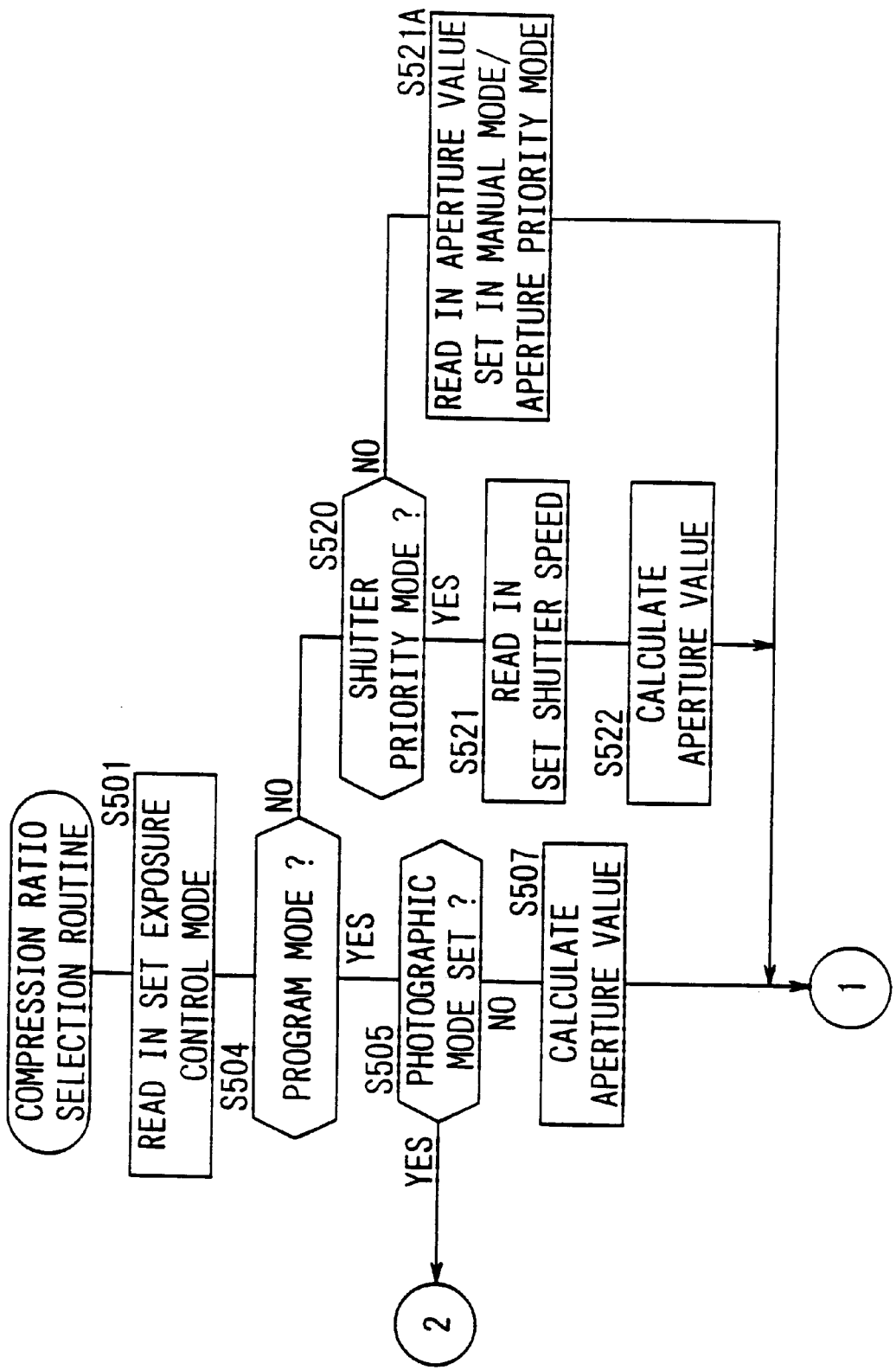
FIG. 18 is a flow chart for explanation of the operation of a third preferred embodiment still camera.
Figure 19:
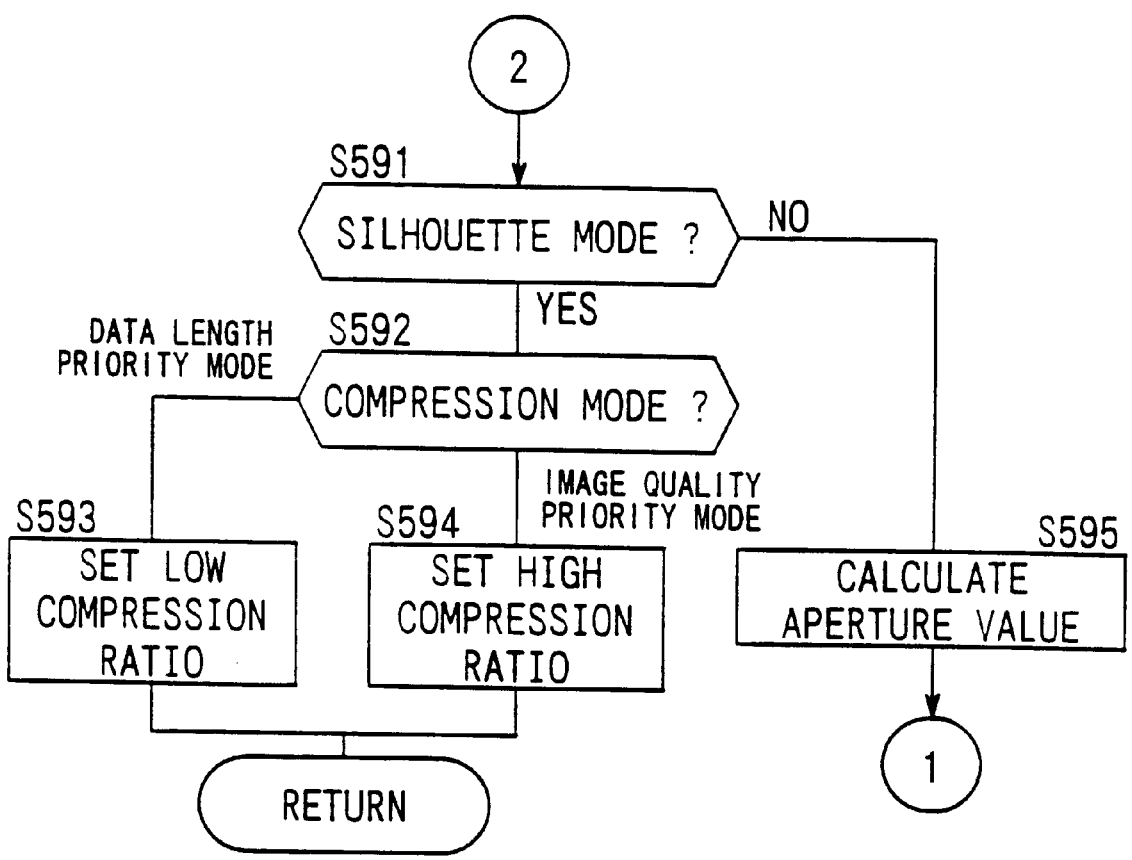
FIG. 19 is a flow chart following FIG. 18.

FIGS. 18 and 19 are flow charts showing the operation of the other preferred embodiment a part of which differs from the operation of the second preferred embodiment described above. The step S506 in FIG. 10 of the above-described preferred embodiment is replaced by the steps S591 through S595. Accordingly, only this portion will be explained. Steps which correspond to steps in the flow charts for the preferred embodiment described above, will be denoted by the same reference numerals. with this embodiment, the observation has been made that there is no correlation between an image which has been photographed in the silhouette mode and the set aperture value as compared with images which have been photographed in other modes.

In the step S505, if it is judged that the photographic mode is set, the flow goes to the step S591 (FIG. 19). Referring to FIG. 19, in the step S591 a decision is made as to whether or not the photographic mode is the silhouette mode. If the decision is YES, then the flow goes to the step S592, while if the decision is NO then the flow goes to the step S595.

In the step S592, i.e. when the silhouette mode is set, a decision is made from the setting of the compression mode setting switch 43 as to whether the image quality priority mode or the data length priority mode is set. If the image quality priority mode is set, the high compression ratio is selected in the step S594, and a command signal is sent to the control section 40A for selecting the quantization table in order to implement this high compression ratio. On the other hand, if the data length priority mode is set, the low compression ratio is selected in the step S593, and a command signal is sent to the control section 40A for selecting the quantization table in order to implement this low compression ratio. The rationale for setting the compression ratio during the silhouette mode in this way has already been described above.

If the decision in the step S591 produces a NO result, in the step S595, a suitable aperture value is calculated, based upon the characteristic program line which corresponds to the photographic mode which is set and upon the brightness value which was measured in the step S201 of FIG. 2; and then the flow goes to the step S508 of FIG. 11. The processing performed in the step S508 and thereafter is the same as in the previously described preferred embodiment, and accordingly the description thereof will be curtailed.

According to this third preferred embodiment, in principle, an appropriate aperture value is calculated based upon the brightness of the object to be photographed as measured by the photometric device and upon the photographic mode or the exposure control mode which is selected, and the compression ratio is automatically selected according to this calculated aperture value. The image quality in the silhouette mode, i.e. the amount of data, is comparatively small and is almost constant, without any dependence upon the aperture value. Therefore in the data length priority mode the compression ratio is set to be low, so as to keep the length of the data almost equal to the data length in the other modes.

Fourth Embodiment

Figure 20:
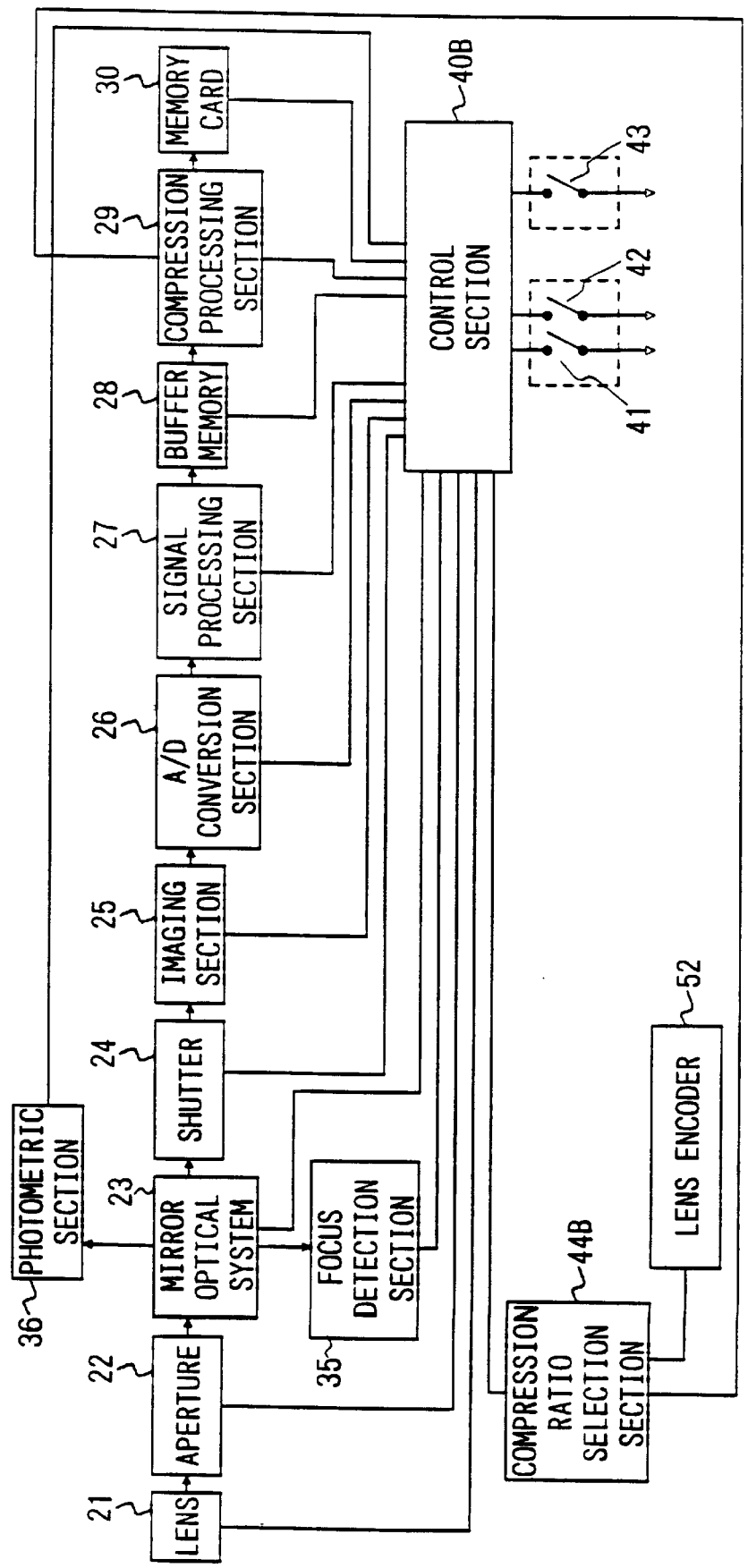
FIG. 20 is a block diagram showing the construction of a fourth preferred embodiment still camera.

FIG. 20 is a block diagram showing the construction of this fourth preferred embodiment.

The reference symbol 44B denotes a compression ratio selection section which includes a microprocessor and the like. This device selects one of a high compression ratio, a medium compression ratio, and a low compression ratio according to the photographic distance, and sends to the control section 40B a command signal for selection of the appropriate one of three quantization tables in the compression processing section 29. In this preferred embodiment, there is provided a lens encoder 52 detecting the lens position of the photographic lens 21. And the lens position detected by the lens encoder 52 is sent to the compression ratio selection section 44B, which calculates the photographic distance. It would also be acceptable to provide a distance measurement device instead of this lens encoder so that the photographic distance is directly measured. The details of the compression ratio selection process will be described hereinafter.

Next, referring to the flow charts shown in FIGS. 21 through 23, and with reference to FIG. 1, the operation of the camera of the fourth preferred embodiment will be explained.

Figure 21:
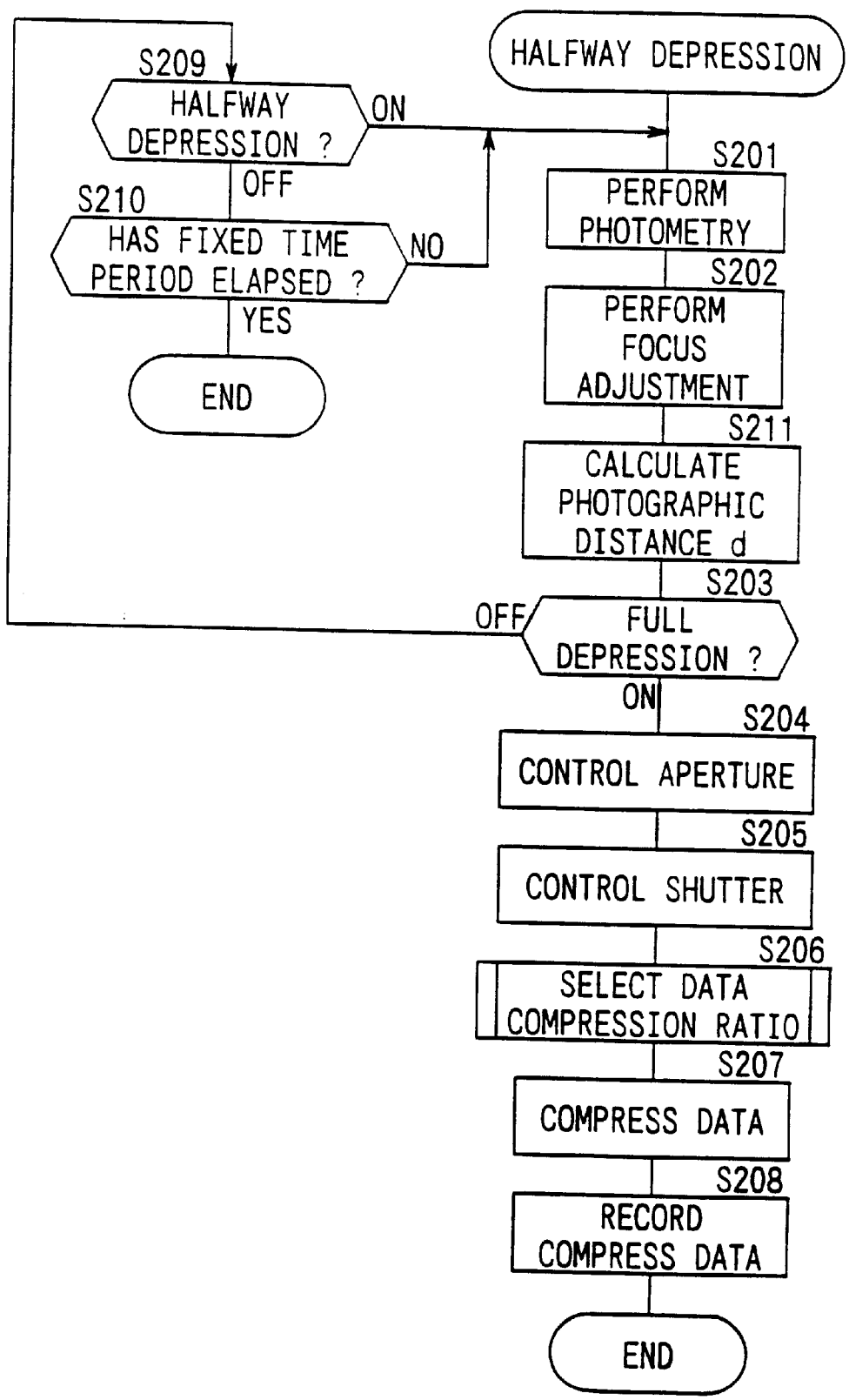
FIG. 21 is a flow chart for explanation of the overall operation of the fourth preferred embodiment still camera.

The program shown in FIG. 21 corresponds to the program shown in FIG. 2, and the points of difference therebetween will be mainly explained. In the step S211, the photographic distance to the object to be photographed is calculated from the lens position.

In the step S204, the control section 40B controls the value of the opening of the aperture 22, based upon the results of the photometric operation which was performed in the step S201, so as to provide the most desirable exposure, and then in the step S206 an operation for selection of the compression ratio is executed according to the calculated photographic distance. FIG. 22 is a flow chart showing the details of the operation of this compression ratio selection. The program shown in this flow chart is executed in the compression ratio selection section 44B. In the step S301A the photographic distance is read in. Next in the step S302A the on or off state of the compression mode setting switch 43 is read in via the control section 40B. If the switch 43 is on and the image quality priority mode is set, then the flow goes to the step S303A. On the other hand, if the switch 43 is off and the data length priority mode is set, then the flow goes to the step S308A.

In the step S303A, a decision is made as to whether or not the photographic distance which was read in in the step S301A is greater than or equal to a predetermined constant value $d_L$. If the decision is YES, then the flow goes to the step S305A, while if the decision is NO then the flow goes to the step S304A. In the step S304A, a decision is made as to whether or not the photographic distance which was read in in the step S301A is greater than a predetermined constant value $d_S$ ($<d_L$). If the decision is NO, then the flow goes to the step S307A, while if the decision is YES then the flow goes to the step S306A.

In the step S305A, the low compression ratio L is selected, and in this step S305A a command signal is sent to the control section 40B for selecting the quantization table in order to implement this low compression ratio L. In the step S306A, the medium compression ratio M is selected, and a command signal is sent to the control section 40B for selecting the quantization table in order to implement this medium compression ratio M. On the other hand, in the step S307A, the high compression ratio H is selected, and a command signal is sent to the control section 40B for selecting the quantization table in order to implement the high compression ratio H. The summary in the foregoing can be indicated in the table shown in FIG. 24.

Figure 22:
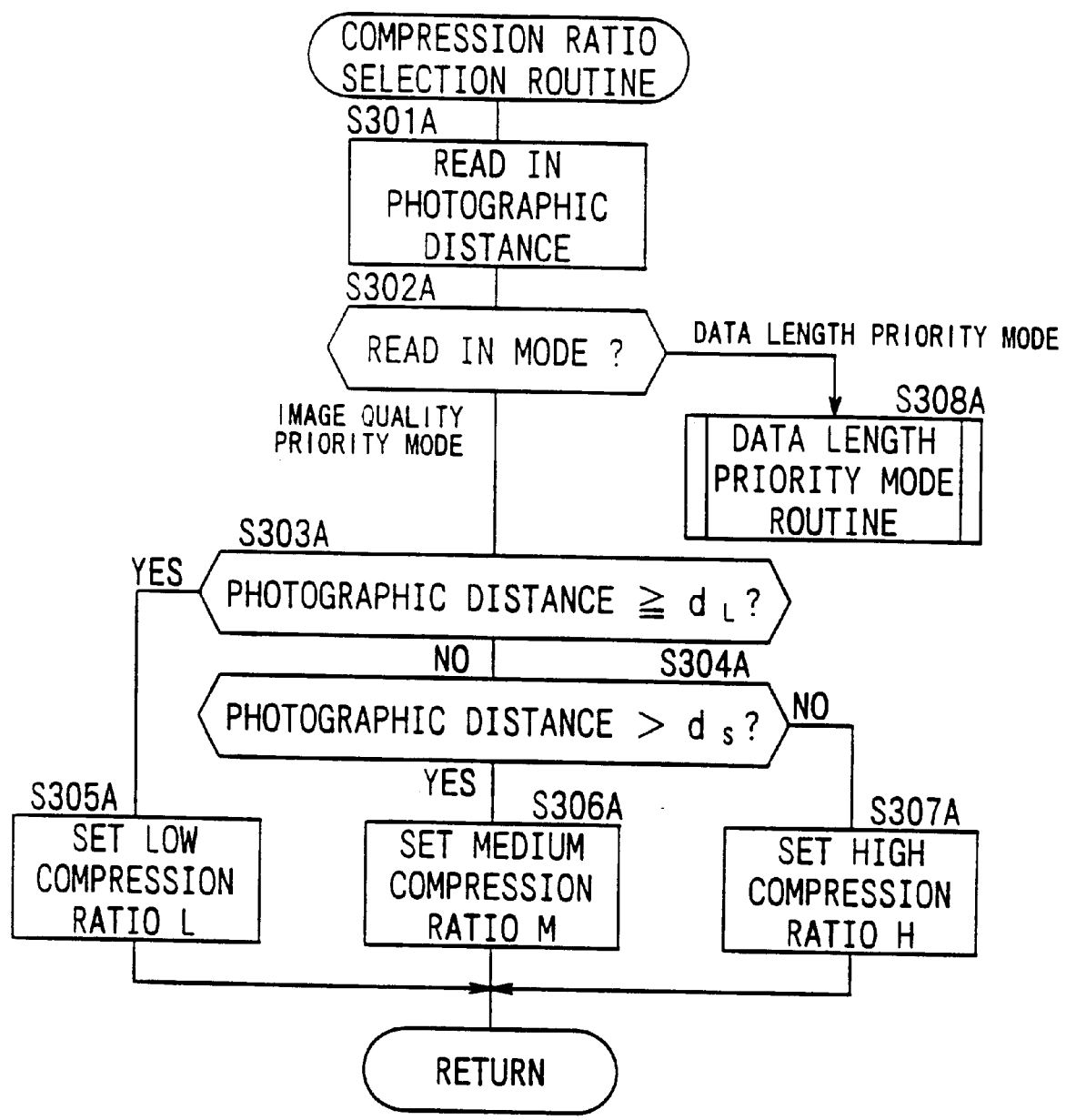
FIG. 22 is a flow chart for explanation of the details of the operation of a compression ratio selection routine for the fourth preferred embodiment still camera.
Figure 23:
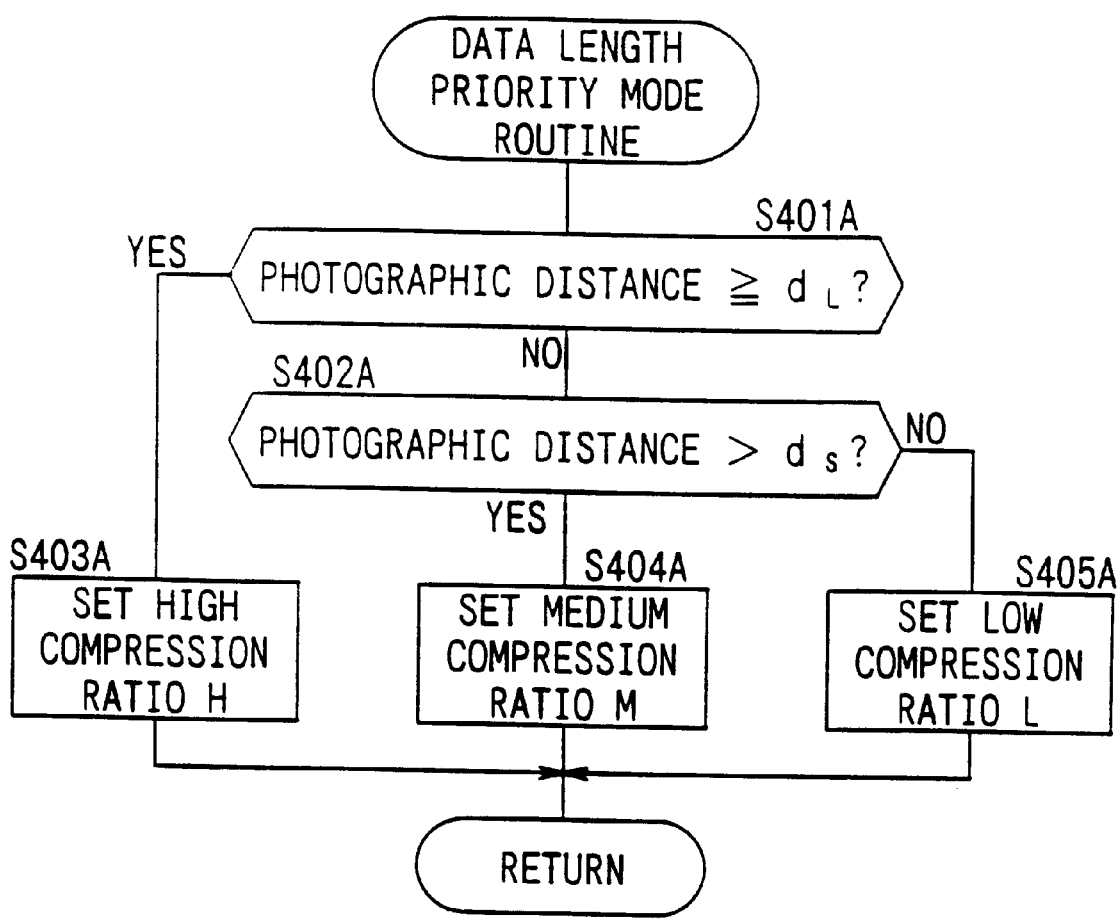
FIG. 23 is a flow chart for explanation of the details of the operation of the compression ratio selection routine for the fourth preferred embodiment still camera, during a data length priority mode.

FIG. 23 is a flow chart showing the details of an operation for performing selection of the compression ratio when the data length priority mode is set. Again, the program shown in this flow chart is executed in the compression ratio selection section 44B. First, in the steps S401A and S402A, the same operations are performed as in the steps S303A and S304A of the flow chart shown in FIG. 22. If the decision in the step S401A is YES, the flow goes to step S403A in which the high compression ratio H is selected, and a command signal is sent to the control section 40B for selecting the quantization table in order to implement this high compression ratio H. Alternatively, if the decision in the step S402A is NO, the flow goes to the step S405A in which the low compression ratio L is selected, and a command signal is sent to the control section 40B for selecting the quantization table in order to implement this low compression ratio L. On the other hand, if the decision in the step S402A is YES, the flow goes to the step S404A in which the medium compression ratio M is selected, and a command signal is sent to the control section 40B for selecting the quantization table in order to implement this medium compression ratio M. The summary in the foregoing can be indicated in the table shown in FIG. 25.

In this manner, in the image quality priority mode, the further away is the photographic distance the lower is the compression ratio which is selected; on the contrary, in the data length priority mode, the further away is the photographic distance the higher is the compression ratio which is selected. This means that, since the depth of the photographic field is the deeper the further away is the photographic distance, so that an image incorporating more data is obtained because a relatively larger number of objects to be photographed within the photographic field are in reasonable focus, therefore in the image quality priority mode the action of lowering the compression ratio for the large amount of image data is performed, in order to obtain playback of a faithful picture. On the other hand, since the higher is the amount of image data the longer is the data length even after the compression process, therefore in the data length priority mode the action of raising the compression ratio for the large amount of image data is performed, in order to keep the data length for one frame stored on the memory card 30 as constant as possible.

Thus, according to this preferred embodiment, the compression ratio is automatically selected according to the photographic distance, and thereby the same advantages and benefits are obtained as those of the other preferred embodiments described above.

Fifth Embodiment
(Setting of Compression Ratio According to Focal Distance)

Figure 26:
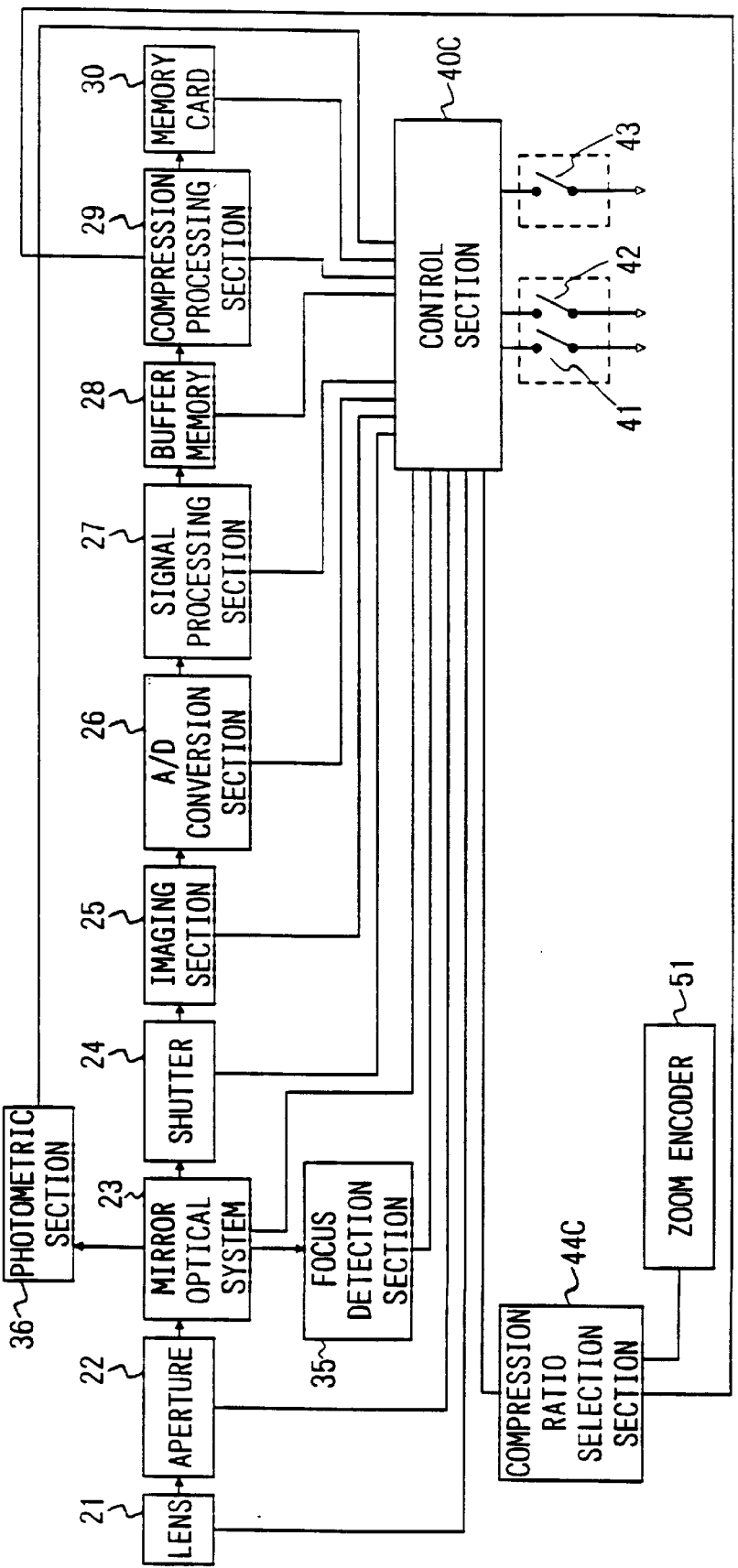
FIG. 26 is a block diagram showing the construction of the fifth preferred embodiment still camera.

FIGS. 26 through 29 are a block diagram and flow charts showing the still camera according to this fifth preferred embodiment in which a compression ration is selected in accordance with a focal length. If the photographic lens 21 is a zoom lens, as shown in FIG. 26, there is provided a zoom encoder 51 and the focal distance detected by the zoom encoder 51 is supplied to the compression ratio selection section 44C.

Figure 27:
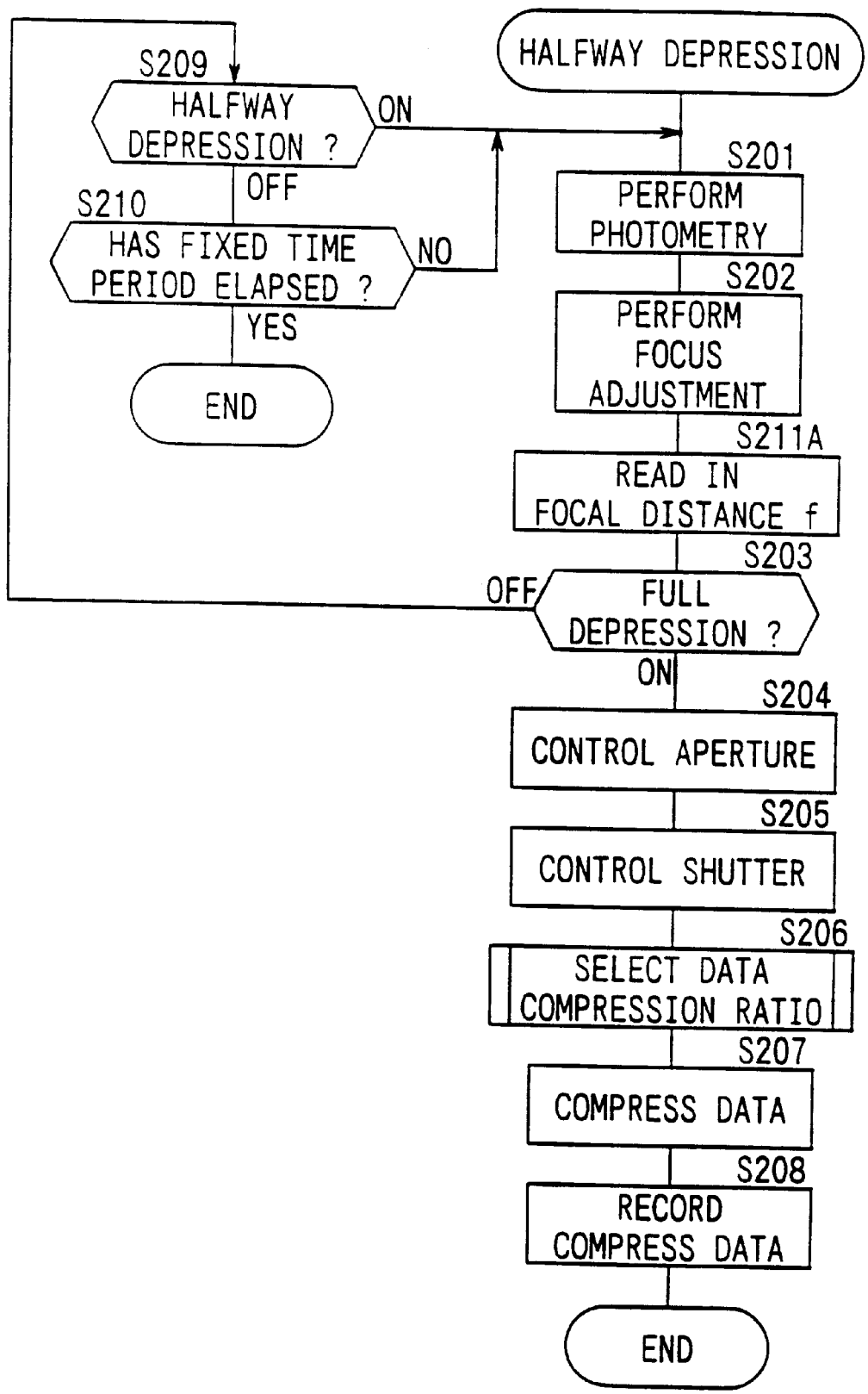
FIG. 27 is a flow chart for explanation of the operation of the fifth preferred embodiment still camera.

FIG. 27 shows a flow chart corresponding to the flow chart shown in FIG. 21. In the step S211A, the focal distance f is read in from the zoom encoder 51. The other steps of the flow chart are the same as those of the FIG. 21 flow chart and are denoted by the same reference symbols, and their description will be curtailed.

Figure 28:
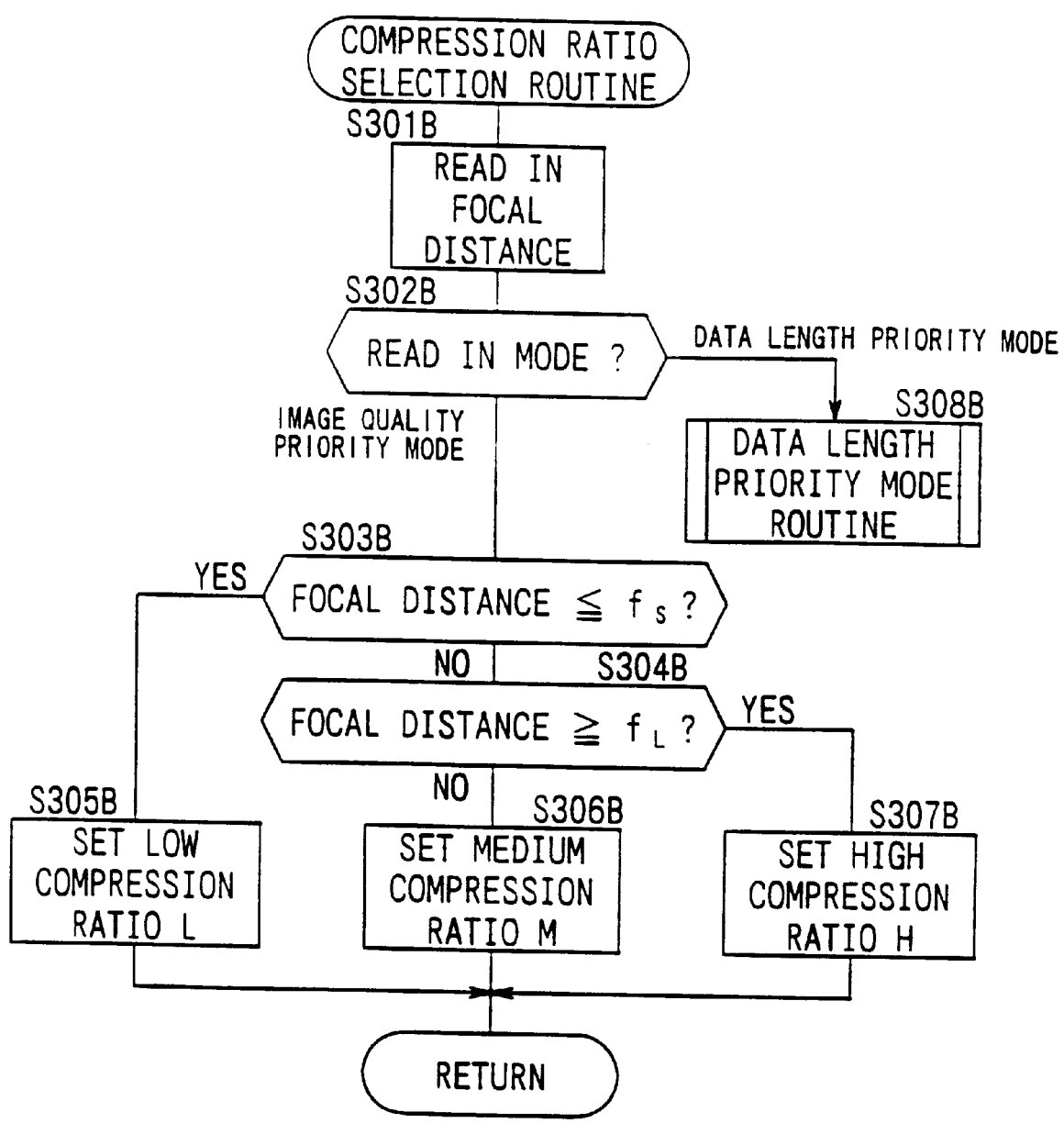
FIG. 28 is a flow chart for explanation of the details of the operation of a compression ratio selection routine for the fifth preferred embodiment still camera.
Figure 29:
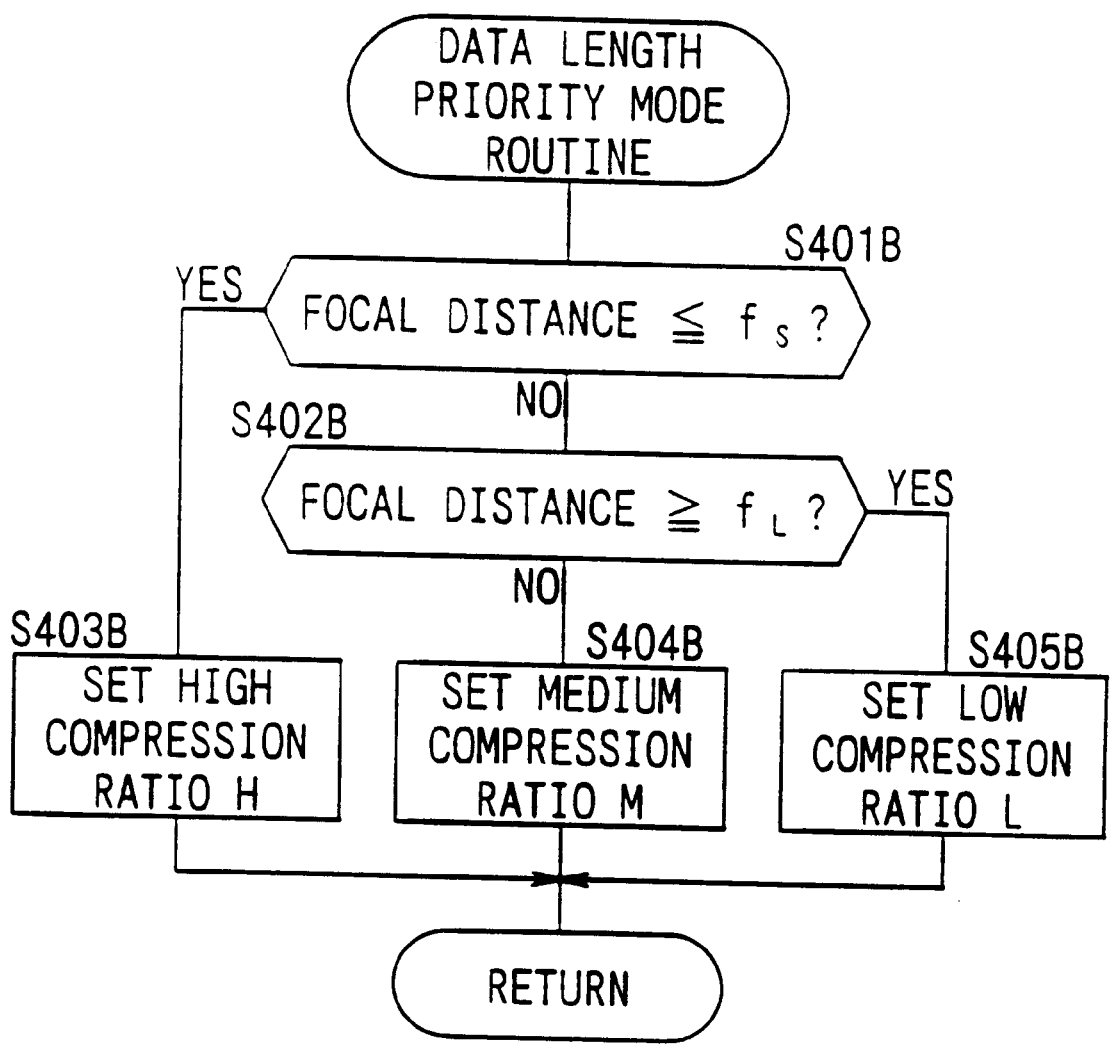
FIG. 29 is a flow chart for explanation of the details of the operation of the compression ratio selection routine for the fifth preferred embodiment still camera, during a data length priority mode.

FIGS. 28 and 29 are flow charts which respectively correspond to the flow charts shown in FIGS. 22 and 23. The points of difference between FIGS. 28 and 29, and FIGS. 22 and 23, are that the focal distance is substituted for the photographic distance, and that $f_L$ and $f_S$ are substituted for the $d_L$ and $d_S$ respectively. In the image quality priority mode: if the focal distance is less than or equal to the lower limit value $f_S$, the low compression ratio is selected in the step S305B; if the focal distance is the medium value between the upper limit value $f_L$ and the lower limit value $f_S$, the medium compression ratio is selected in the step S306B; and, if the focal distance is greater than or equal to the upper limit value $f_L$, the high compression ratio is selected in the step S307B. The summary in the foregoing can be indicated in the table shown in FIG. 30.

In the data length priority mode: if the focal distance is less than or equal to the lower limit value $f_S$, the high compression ratio is selected in the step S403B; if the focal distance is the medium value between the upper limit value $f_L$ and the lower limit value $f_S$, the medium compression ratio is selected in the step S404B; and, if the focal distance is greater than or equal to the upper limit value $f_L$, the low compression ratio is selected in the step S405B. The summary in the foregoing can be indicated in the table shown in FIG. 31.

In this manner, with this preferred embodiment shown in FIGS. 26 through 29, in the image quality priority mode, the shorter the focal distance becomes, the lower is the compression ratio which is selected; while, on the contrary, in the data length priority mode, the shorter the focal distance becomes, the higher is the compression ratio which is selected. This means that, since the shorter is the focal distance the greater is the range of target objects which appear within the photographic field, and also the depth of field becomes greater so that overall the focusing of the image is better, therefore in the image quality priority mode the action of lowering the compression ratio for this large amount of image data is performed, in order to obtain an image faithful to the target object when playback. On the other hand, since the higher is the amount of data the longer is the data length after the compression process has been performed, therefore in the data length priority mode the action of raising the compression ratio for this high amount of image data is performed, in order to keep the data length for one frame stored on the memory card 30 as constant as possible.

Sixth Embodiment
(Setting of Compression Ratio According to Photographic Distance and Focal Distance)

Figure 32:
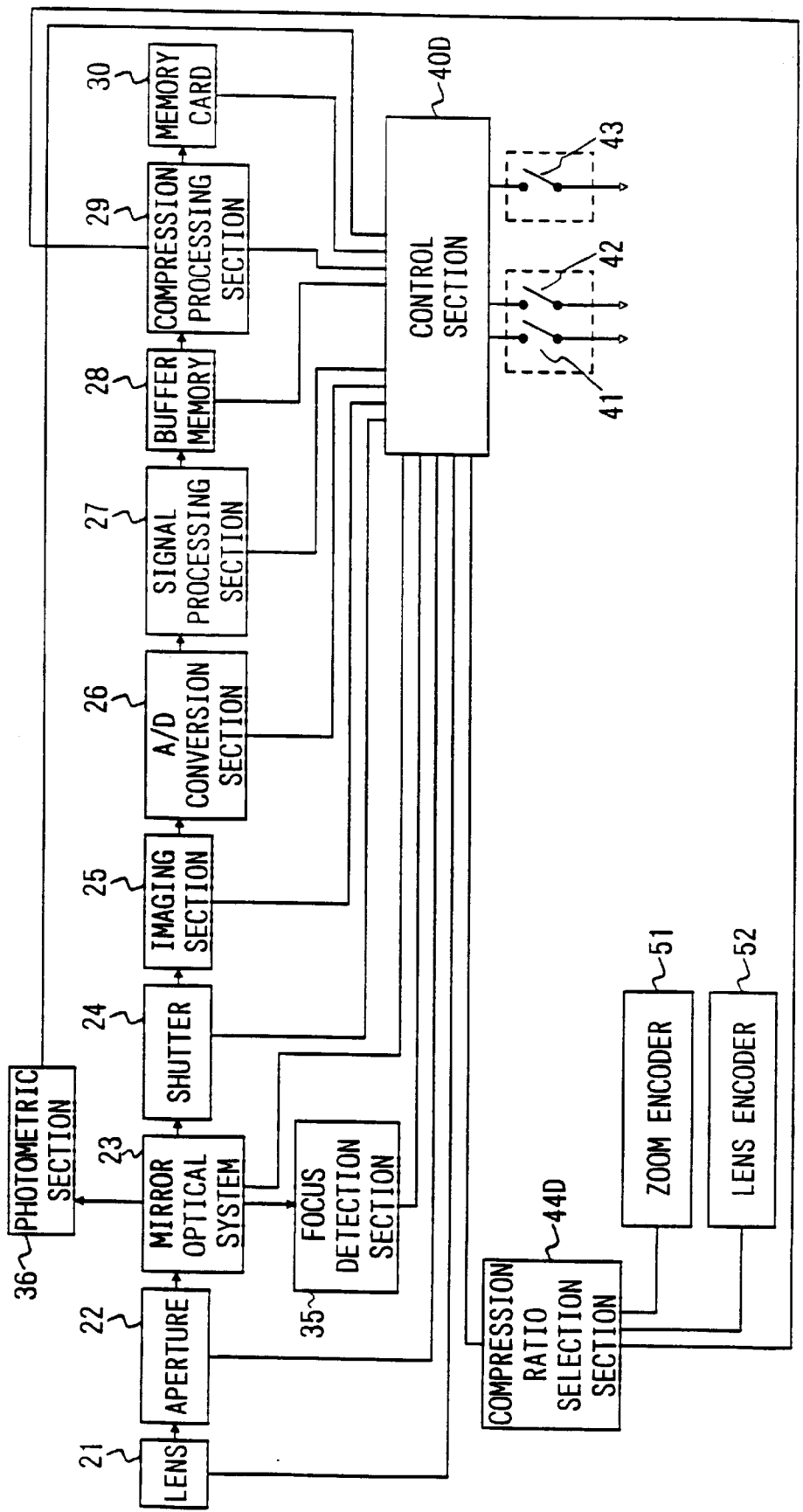
FIG. 32 is a block diagram showing the construction of the sixth preferred embodiment still camera.

In the above, the compression ratio was selected only according to the photographic distance, or the compression ratio was selected only according to the focal distance; but it is acceptable that the compression ratio is selected according to the combination of the respective photographic distance and focal distance. FIG. 32 is a block diagram showing the preferred embodiment of such still camera. Elements which are the same as elements shown in FIGS. 20 and 26 are denoted by the same reference numerals, and the points of difference therebetween will be explained. To the compression ratio selection section 44D, supplied are a lens position from a lens encoder 52 which detects the lens position of the photographic lens 21 and a focal distance from a zoom encoder 51. The compression ratio selection section 44D calculates a photographic distance based on a lens position and an compression ratio according to the calculated photographic distance and the focal distance detected by the zoom encoder 51, and controls the compression processing section 29 via the control section 40D.

Figure 33:
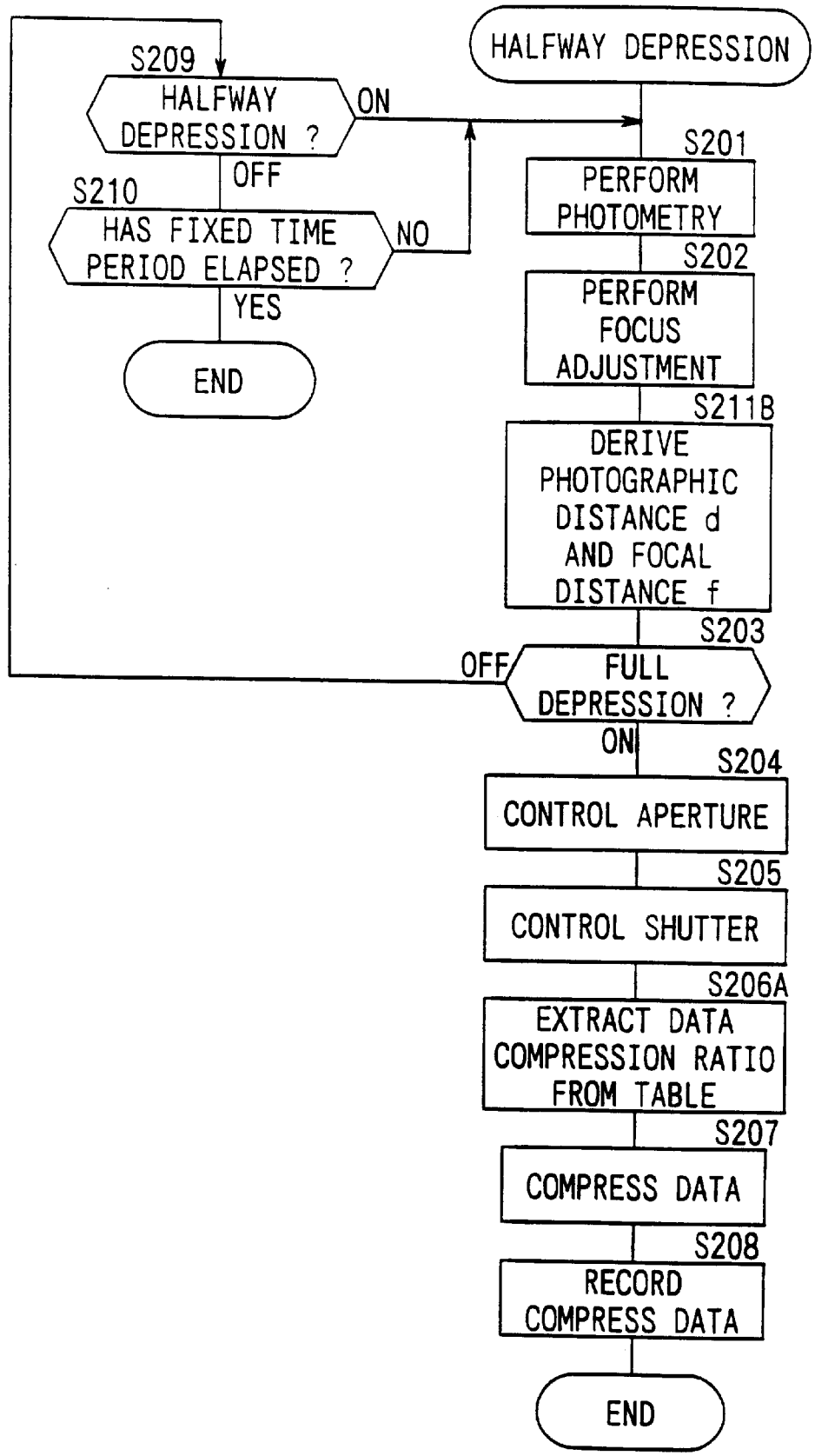
FIG. 33 is a flow chart for explanation of the operation of the sixth preferred embodiment still camera.

FIG. 33 is a main flow chart for this embodiment corresponding to the flow charts shown in FIGS. 21 and 27. Steps which are the same as steps in FIGS. 21 and 27 are denoted by the same reference symbols, and the points of difference therebetween will be explained. In the step S211B, the photographic distance and the focal distance are detected. In the step S206A, an appropriate compression ratio is calculated referring to the tables shown in FIGS. 34 and 35 based on the photographic distance and the focal distance detected in the step S211B.

FIG. 34 shows a table for the compression ratio selected and set according to combinations of the photographic distance and the focal distance in the image quality priority mode. While FIG. 35 shows a table for the compression ratio selected and set according to combinations of the photographic distance and the focal distance in the data length priority mode. In FIGS. 34 and 35, f1, f2, f3, d1, d2 and d3 are as follows:

f1<50 mm, 50 mm≦f2≦120 mm, 120 mm<f3
d1<50 cm, 50 cm≦d2≦100 cm, 100 cm<d3

Seventh Embodiment
(Setting of Compression Ratio According to Photographic Distance, Focal Distance and Aperture Value)

It is acceptable that the compression ratio is selected according to combinations of the photographic distance, focal distance and the aperture. FIG. 36 is a block diagram showing the embodiment of such still camera. Elements which are the same as elements shown in FIGS. 20, 26, and 32 are denoted by the same reference numerals, and the points of difference therebetween will be explained. To a compression ration selection section 44E, supplied are an aperture value from the aperture 22, a lens position of the photographic lens 21 from the lens encoder 52 and a focal distance from the zoom encoder 51, respectively. The compression ratio selection section 44E calculates a photographic distance from the lens position and the compensation ratio based on the calculated photographic distance, the focal length detected by the zoom encoder 51 and the aperture value, and controls the compression processing section 29 via the control section 40E.

Figure 37:
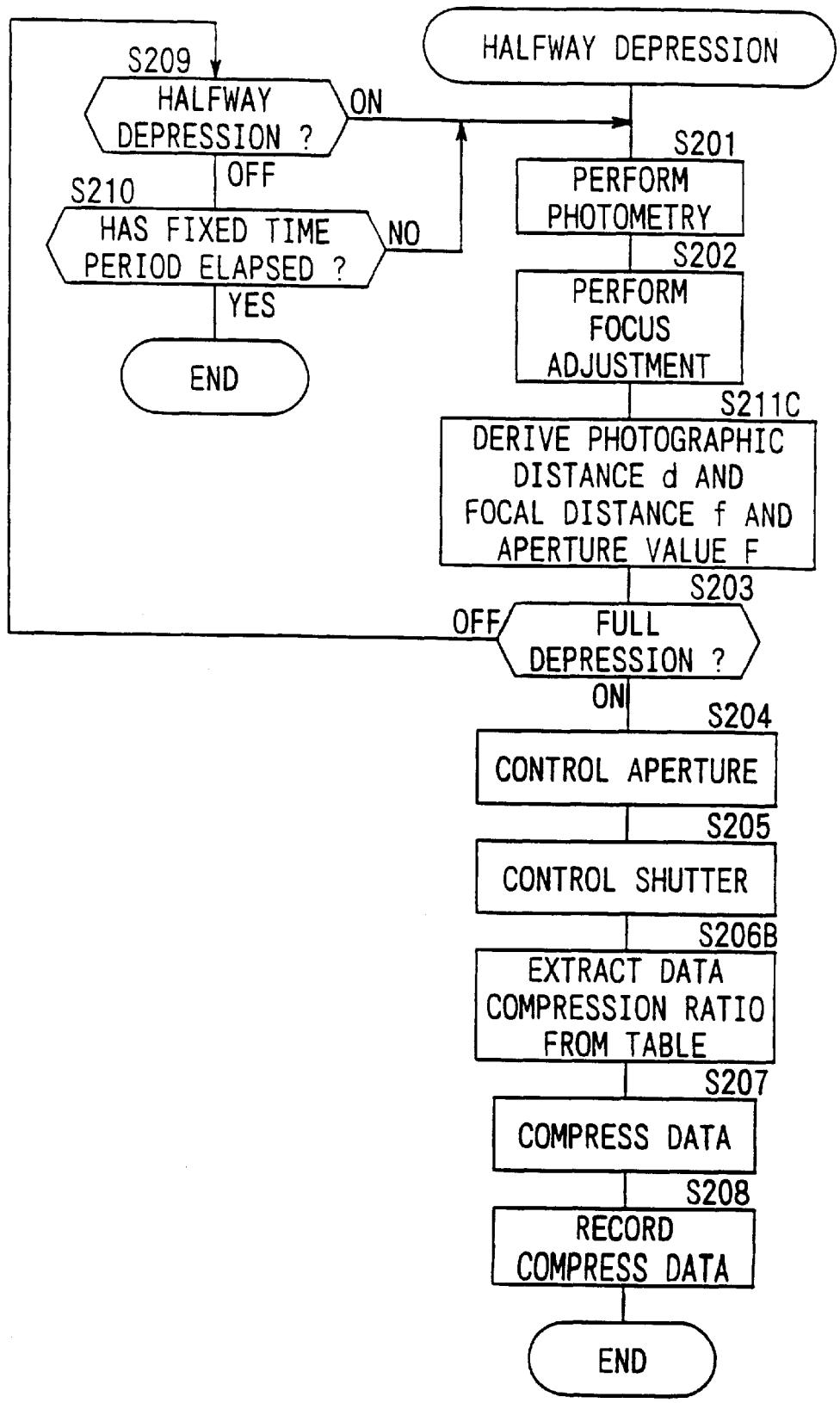
FIG. 37 is a flow chart for explanation of the operation of the seventh preferred embodiment still camera.

FIG. 37 is a main flow chart of this embodiment corresponding to the flow charts shown in FIGS. 21, 27, and 33. Steps which are the same as steps in FIG. 21, 27 and 33 are denoted by the same reference symbols, and the points of difference therebetween will be explained. In the step S211C, the photographic distance, the focal distance, and the aperture value are detected. In the step S206B, an appropriate compression ratio is calculated referring to the tables shown in FIGS. 38 and 39 based on the photographic distance, the focal distance, and the aperture value derived in the step S211C.

FIG. 38 shows a table for the compression ratio selected and set according to combinations of the photographic distance, the focal distance and the aperture value in the image quality priority mode. While FIG. 39 shows a table for the compression ratio selected and set according to combinations of the photographic distance, the focal distance and the aperture value in the data length priority mode. In FIGS. 38 and 39, f1, f2, f3, d1, d2, d3, F1, F2 and F3 are as follows:

f1<50 mm, 50 mm≦f2≦120 mm, 120 mm<f3
d1<50 cm, 50 cm≦d2≦100 cm, 100 cm<d3
F1<2.8, 2.8≦F2≦5.6, 5.6<F3

We claim:

1. An electronic camera which stores compressed image data upon a recording medium, comprising:
an imaging device which forms an image of an object to be photographed and outputs digital image data;
a data compression circuit which compresses said image data from said imaging device according to a predetermined compression ratio; and
a compression ratio control circuit which derives and controls said compression ratio for said data compression circuit, based at least upon the distance to said object to be photographed.

2. An electronic camera according to claim 1, further comprising an image quality priority mode setting circuit which sets an image quality priority mode in which said image data is to be compressed while giving precedence to the image quality of the image of the object to be photographed formed by said imaging device; and
wherein said compression ratio control circuit, when said image quality priority mode is set, controls said compression ratio to be the smaller, the greater is said photographic distance.

3. An electronic camera according to claim 1, further comprising a data length priority mode setting circuit which sets a data length priority mode in which said image data is to be compressed so that the length of the image data which is to be recorded upon said recording medium becomes approximately constant; and
wherein said compression ratio control circuit, when said data length priority mode is set, controls said compression ratio to be the greater, the greater is said photographic distance.

4. An electronic camera according to claim 1, further comprising a compression mode setting circuit, which sets an image quality priority mode in which said image data is to be compressed while giving precedence to the image quality of the image of the object to be photographed formed by said imaging device, and a data length priority mode in which said image data is to be compressed so that the length of the image data which is to be recorded upon said recording medium becomes approximately constant; and wherein said compression ratio control circuit: when said image quality priority mode is set, controls said compression ratio to be the smaller, the greater is said photographic distance; and, when said data length priority mode is set, controls said compression ratio to be the greater, the greater is said photographic distance.

5. An electronic camera which stores compressed image data upon a recording medium, comprising:

an imaging device which forms an image of an object to be photographed through a photographic lens and outputs digital image data;

a data compression circuit which compresses said image data from said imaging device according to a predetermined compression ratio; and a compression ratio control circuit which derives and controls said compression ratio for said data compression circuit, based at least upon the distance to said object to be photographed and upon the focal distance of said photographic lens.

6. An electronic camera according to claim 5, further comprising an image quality priority mode setting circuit which sets an image quality priority mode in which said image data is to be compressed while giving precedence to the image quality of the image of the object to be photographed formed by said imaging device; and wherein said compression ratio control circuit, when said image quality priority mode is set, controls said compression ratio to be the smaller, the greater is said photographic distance, and the smaller is said focal distance.

7. An electronic camera according to claim 5, further comprising a data length priority mode setting circuit which sets a data length priority mode in which said image data is to be compressed so that the length of the image data which is to be recorded upon said recording medium becomes approximately constant; and wherein said compression ratio control circuit, when said data length priority mode is set, controls said compression ratio to be the greater, the greater is said photographic distance, and the smaller is said focal distance.

8. An electronic camera according to claim 5, further comprising a compression mode setting circuit, which sets an image quality priority mode in which said image data is to be compressed while giving precedence to the image quality of the image of the object to be photographed formed by said imaging device, and a data length priority mode in which said image data is to be compressed so that the length of the image data which is to be recorded upon said recording medium becomes approximately constant; and wherein said compression ratio control circuit: when said image quality priority mode is set, controls said compression ratio to be the smaller, the greater is said photographic distance, and the smaller is said focal distance; and, when said data length priority mode is set, controls said compression ratio to be the greater, the greater is said photographic distance, and the smaller is said focal distance.

9. An electronic camera which stores compressed image data upon a recording medium, comprising:

an imaging device which forms an image of an object to be photographed through a photographic lens and outputs digital image data;

an aperture device which controls the amount of light incident upon said imaging device;

a data compression circuit which compresses said image data from said imaging device according to a predetermined compression ratio; and a compression ratio control circuit which derives and controls said compression ratio for said data compression circuit, based at least upon the distance to said object to be photographed, upon the focal distance of said photographic lens, and upon the aperture value of said aperture device.

10. An electronic camera according to claim 9, further comprising an image quality priority mode setting circuit which sets an image quality priority mode in which said image data is to be compressed while giving precedence to the image quality of the image of the object to be photographed formed by said imaging device; and wherein said compression ratio control circuit, when said image quality priority mode is set, controls said compression ratio to be the smaller, the greater is said photographic distance, the smaller is said focal distance, and the greater is said aperture value.

11. An electronic camera according to claim 9, further comprising a data length priority mode setting circuit which sets a data length priority mode in which said image data is to be compressed so that the length of the image data which is to be recorded upon said recording medium becomes approximately constant; and wherein said compression ratio control circuit, when said data length priority mode is set, controls said compression ratio to be the greater, the greater is said photographic distance, the smaller is said focal distance, and the greater is said aperture value.

12. An electronic camera according to claim 9, further comprising a compression mode setting circuit, which sets an image quality priority mode in which said image data is to be compressed while giving precedence to the image quality of the image of the object to be photographed formed by said imaging device, and a data length priority mode in which said image data is to be compressed so that the length of the image data which is to be recorded upon said recording medium becomes approximately constant; and wherein said compression ratio control circuit: when said image quality priority mode is set, controls said compression ratio to be the smaller, the greater is said photographic distance, the smaller is said focal distance, and the greater is said aperture value; and, when said data length priority mode is set, controls said compression ratio to be the greater, the greater is said photographic distance, the smaller is said focal distance, and the greater is said aperture value.

13. A data recording method for an electronic camera for compressing digital image data and recording the compressed data upon a recording medium, comprising:

the process of forming an image of an object to be photographed in an imaging device and outputting said digital image data;

the process of measuring the photographic distance to said object to be photographed;

the process of deriving a compression ratio based at least upon said measured photographic distance; and the process of compressing said digital image data from said imaging device according to said derived compression ratio and recording the compressed data upon said recording medium.

* * * * *